(12) United States Patent
Takahashi

(10) Patent No.: US 8,261,032 B2
(45) Date of Patent: Sep. 4, 2012

(54) STORAGE SYSTEM TO BACKUP DIRTY DATA ELEMENTS USING A CACHE MEMORY

(75) Inventor: Hideaki Takahashi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 710 days.

(21) Appl. No.: 12/068,321

(22) Filed: Feb. 5, 2008

(65) Prior Publication Data

US 2009/0055590 A1 Feb. 26, 2009

(30) Foreign Application Priority Data

Aug. 22, 2007 (JP) ................. 2007-216019

(51) Int. Cl.
G06F 12/00 (2006.01)
G06F 13/00 (2006.01)
G06F 13/28 (2006.01)

(52) U.S. Cl. ........................................ 711/162
(58) Field of Classification Search ................ 711/162
See application file for complete search history.

(56) References Cited

U.S. PATENT DOCUMENTS 5,701,516 A * 12/1997 Cheng et al. .................. 710/22

6,658,542 B2 * 12/2003 Beardsley et al. ............ 711/162
2007/0094446 A1 * 4/2007 Sone et al. .................... 711/113

FOREIGN PATENT DOCUMENTS

| EP | 1 705 574 A2 | 3/2006 |
|---|---|---|
| GB | 2 256 735 A | 6/1992 |
| JP | 2002-099390 | 9/2000 |

OTHER PUBLICATIONS

The Extended European Search Report, dated Jul. 6, 2009.

* cited by examiner

Primary Examiner — Kevin Ellis
Assistant Examiner — Chad Davidson
(74) Attorney, Agent, or Firm — Volpe and Koenig, P.C.

(57) ABSTRACT

A storage system comprises a plurality of control modules having a plurality of cache memories respectively. One or more dirty data elements out of a plurality of dirty data elements stored in a first cache memory in a first control module are copied to a second cache memory in a second control module. The one or more dirty data elements stored in the second cache memory are backed up to a non-volatile storage resource. The dirty data elements backed up from the first cache memory to the non-volatile storage resource are dirty data elements other than the one or more dirty data elements of which copying has completed, out of the plurality of dirty data elements.

9 Claims, 26 Drawing Sheets

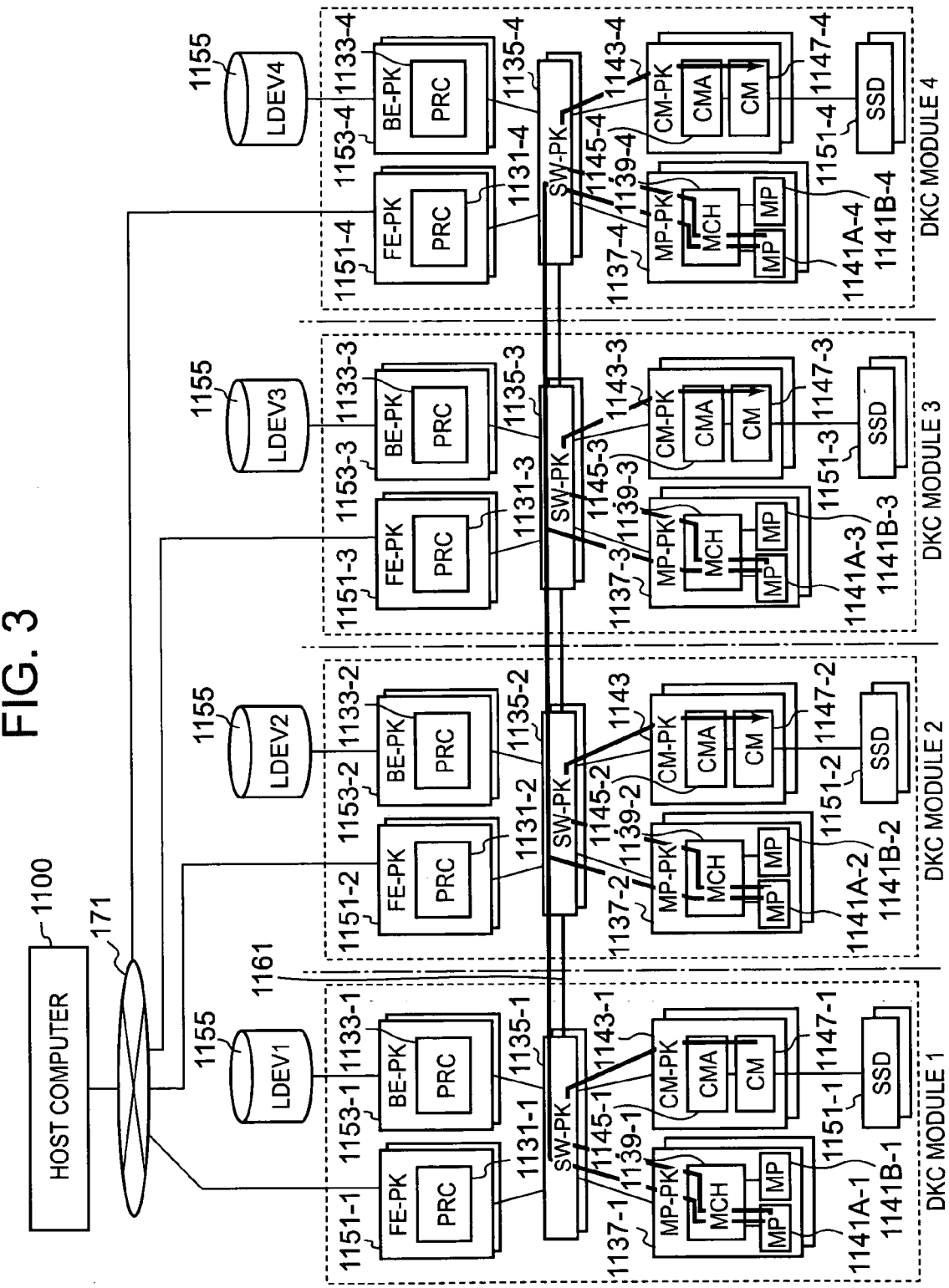

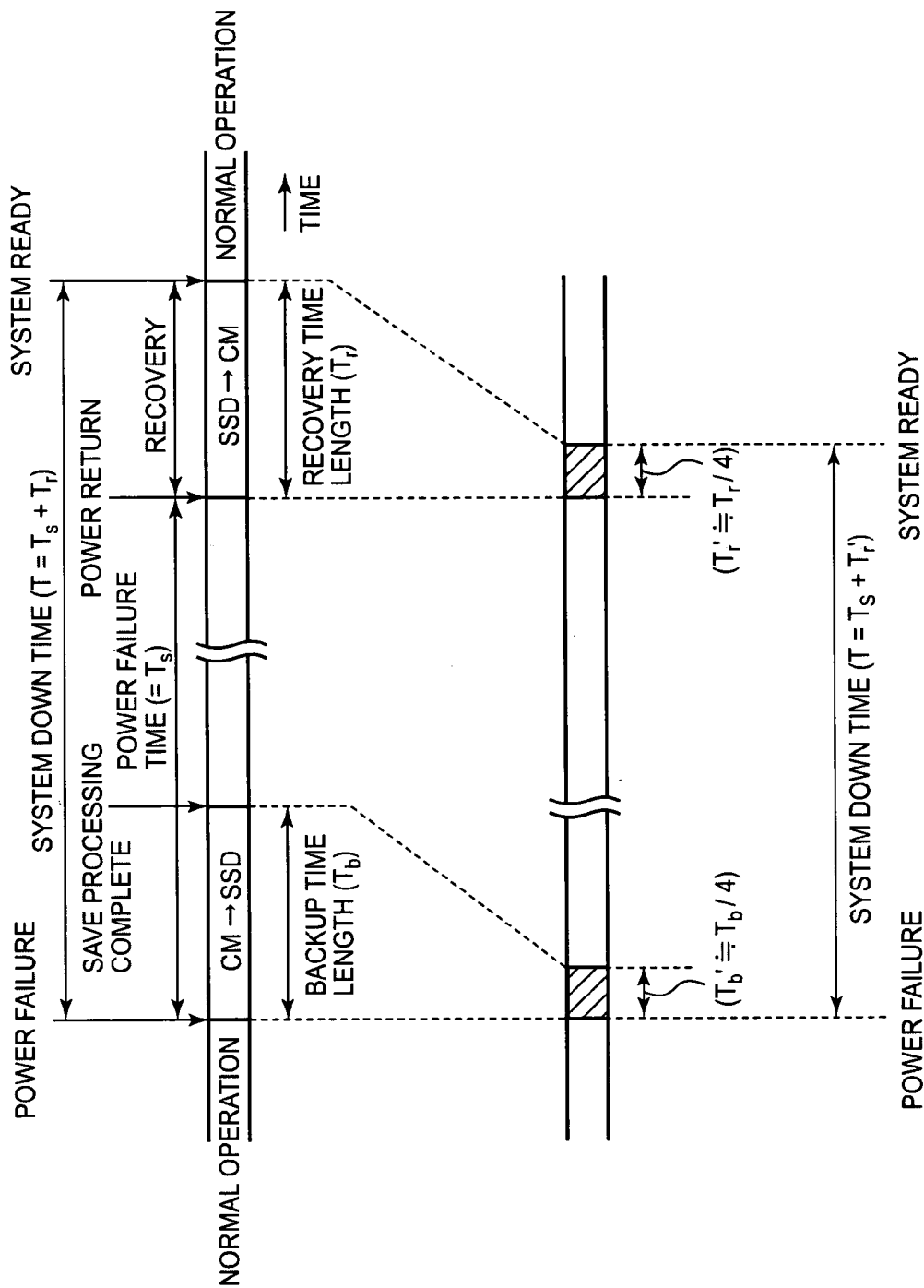

FIG. 6A

FIRST MANAGEMENT INFORMATION — 201A (within 200)

| COPY COMPLETION FLAG | COPY SOURCE INFORMATION (DKC MODULE ID/ CACHE ADDRESS) | COPY DESTINATION INFORMATION (DKC MODULE ID/ CACHE ADDRESS) | BACKUP NECESSITY | SAVE COMPLETION FLAG |
|---|---|---|---|---|
| COMPLETE | 1/001 | 2/001 | NECESSARY | COMPLETE |
| NOT COMPLETE | 1/002 | 3/002 | NECESSARY | NOT COMPLETE |
| COMPLETE | 1/003 | 4/003 | UNNECESSARY | COMPLETE |
| ... | ... | ... | ... | ... |

SECOND MANAGEMENT INFORMATION — 201B

- JOB MANAGEMENT INFORMATION ELEMENTS ON DKC MODULE 1 (COMPLETED JOBS AND INCOMPLETED JOBS)
- JOB MANAGEMENT INFORMATION ELEMENTS ON DKC MODULE 2 (COMPLETED JOBS AND INCOMPLETED JOBS)
- JOB MANAGEMENT INFORMATION ELEMENTS ON DKC MODULE 3 (COMPLETED JOBS AND INCOMPLETED JOBS)
- JOB MANAGEMENT INFORMATION ELEMENTS ON DKC MODULE 4 (COMPLETED JOBS AND INCOMPLETED JOBS)

FIG. 6B

| HEADER FIELD (TRANSMISSION SOURCE DKC MODULE) 1501 | DATA FIELD (DIRTY DATA ELEMENT AND CACHE ADDRESS WHERE THIS DIRTY DATA ELEMENT EXISTED) 1503 |
|---|---|

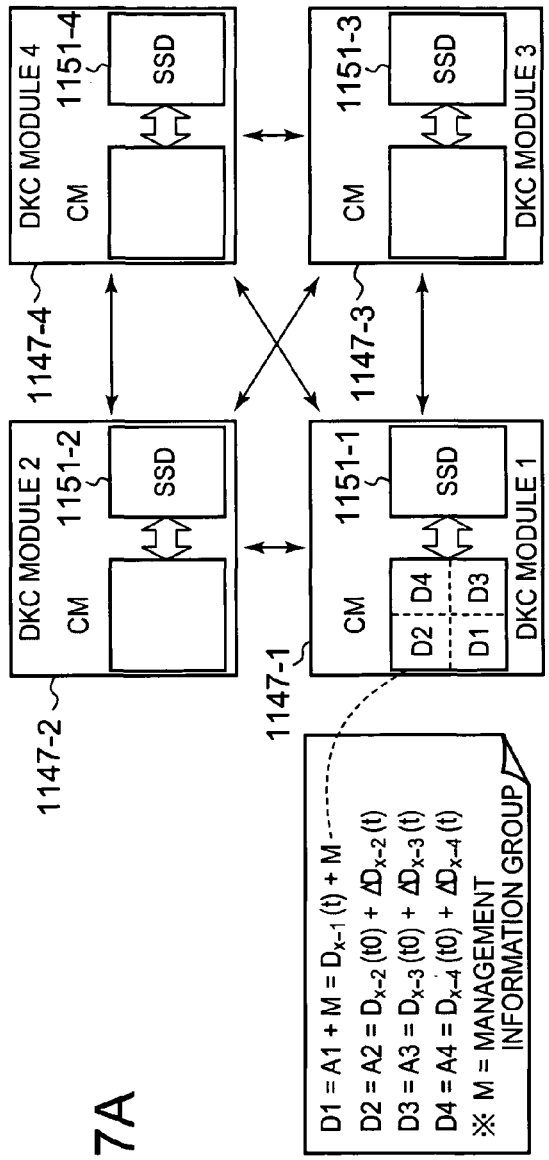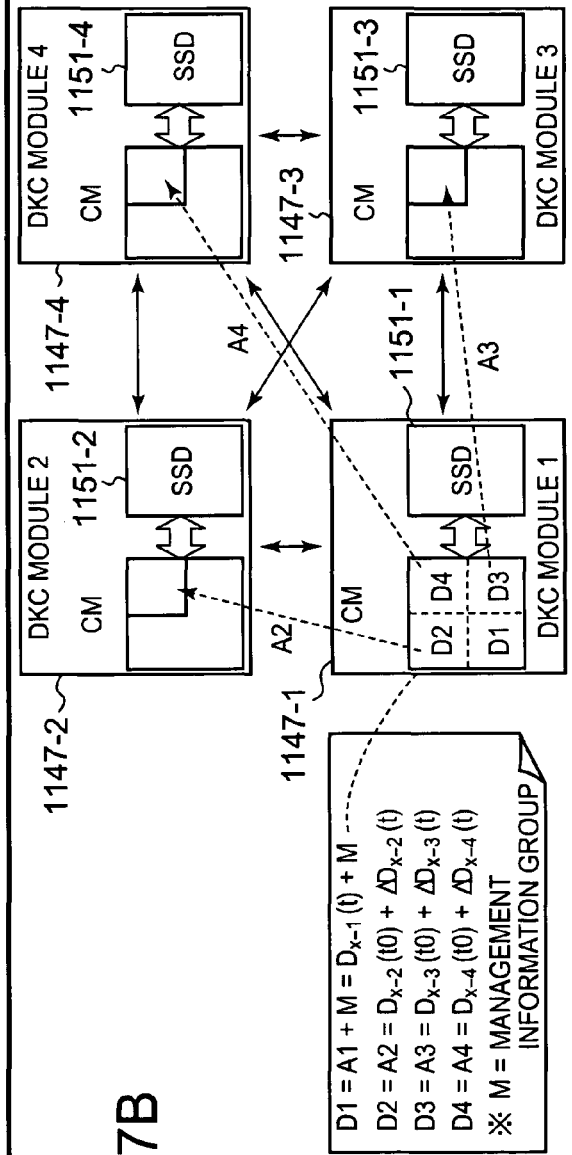
FIG. 7A
FIG. 7B

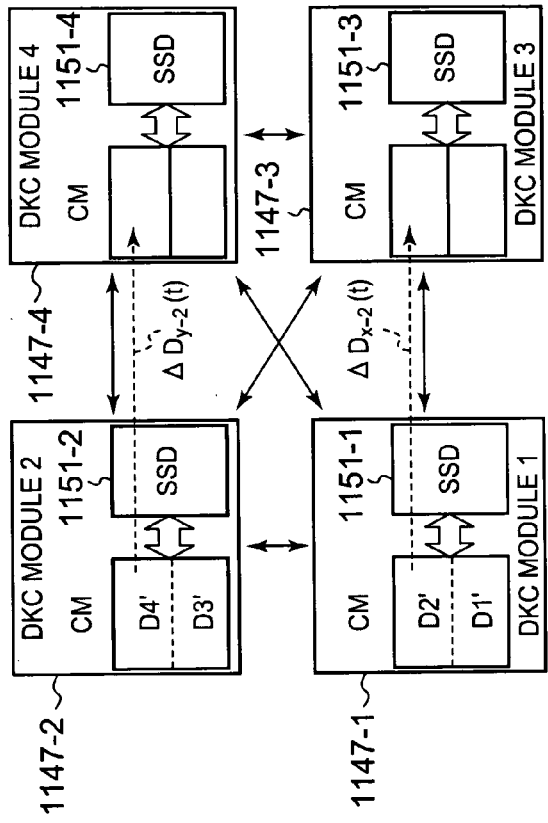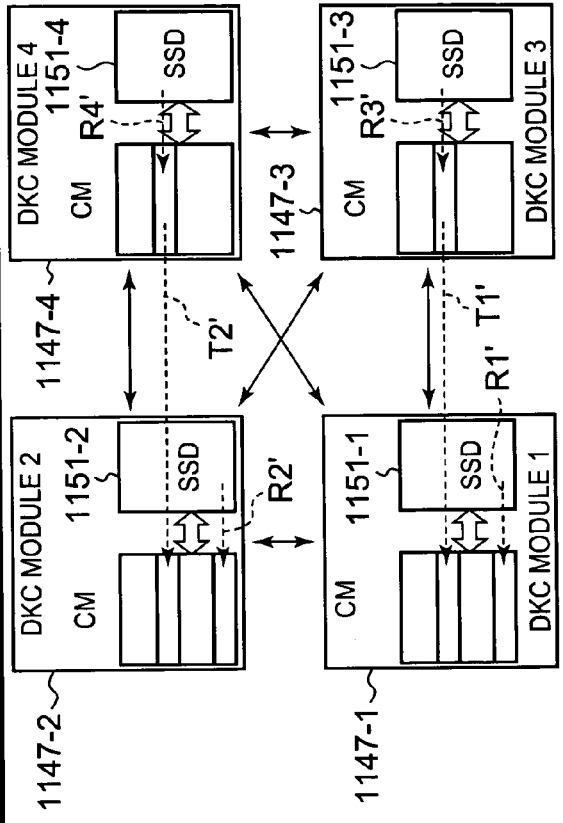
FIG. 10A
FIG. 10B

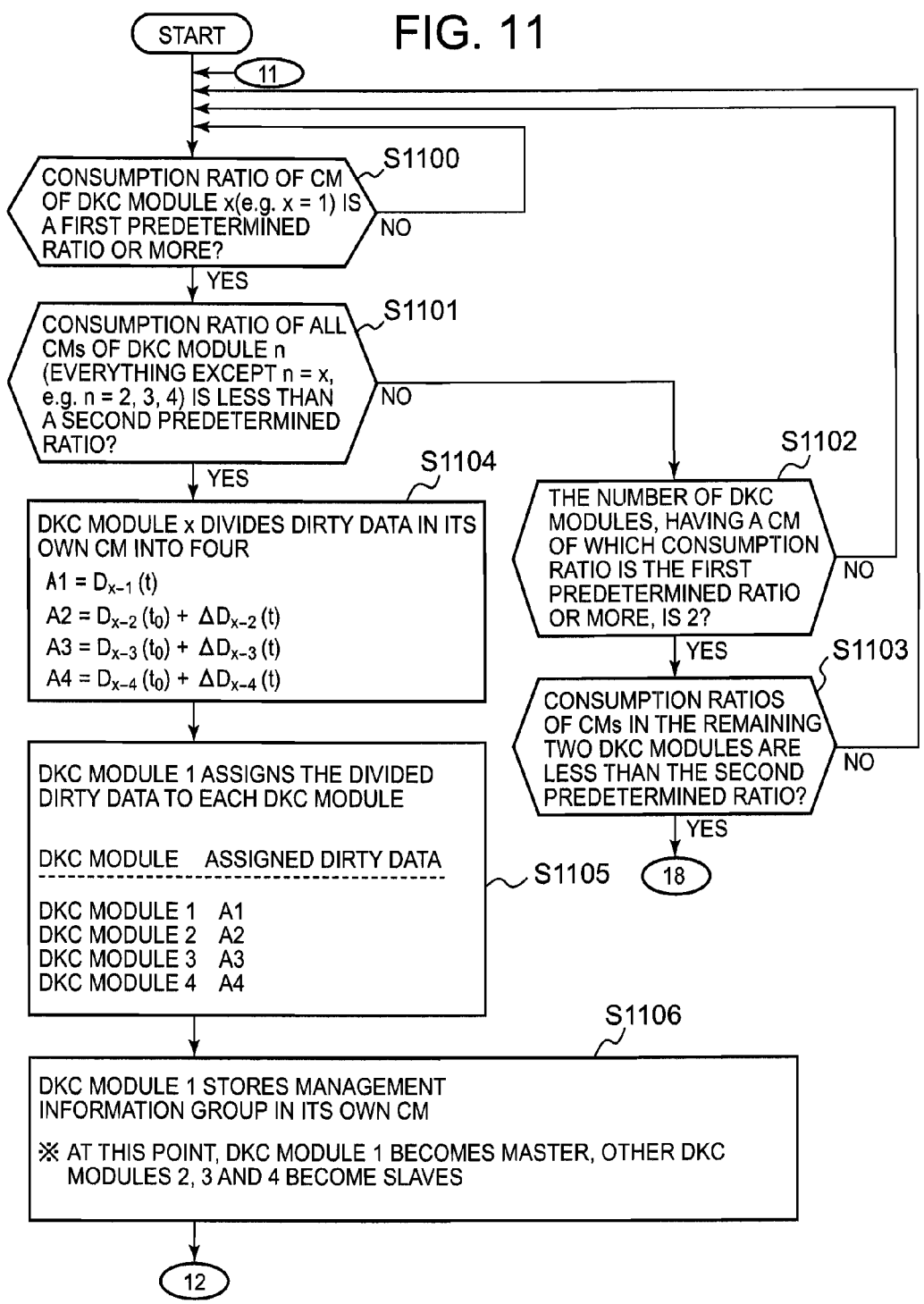

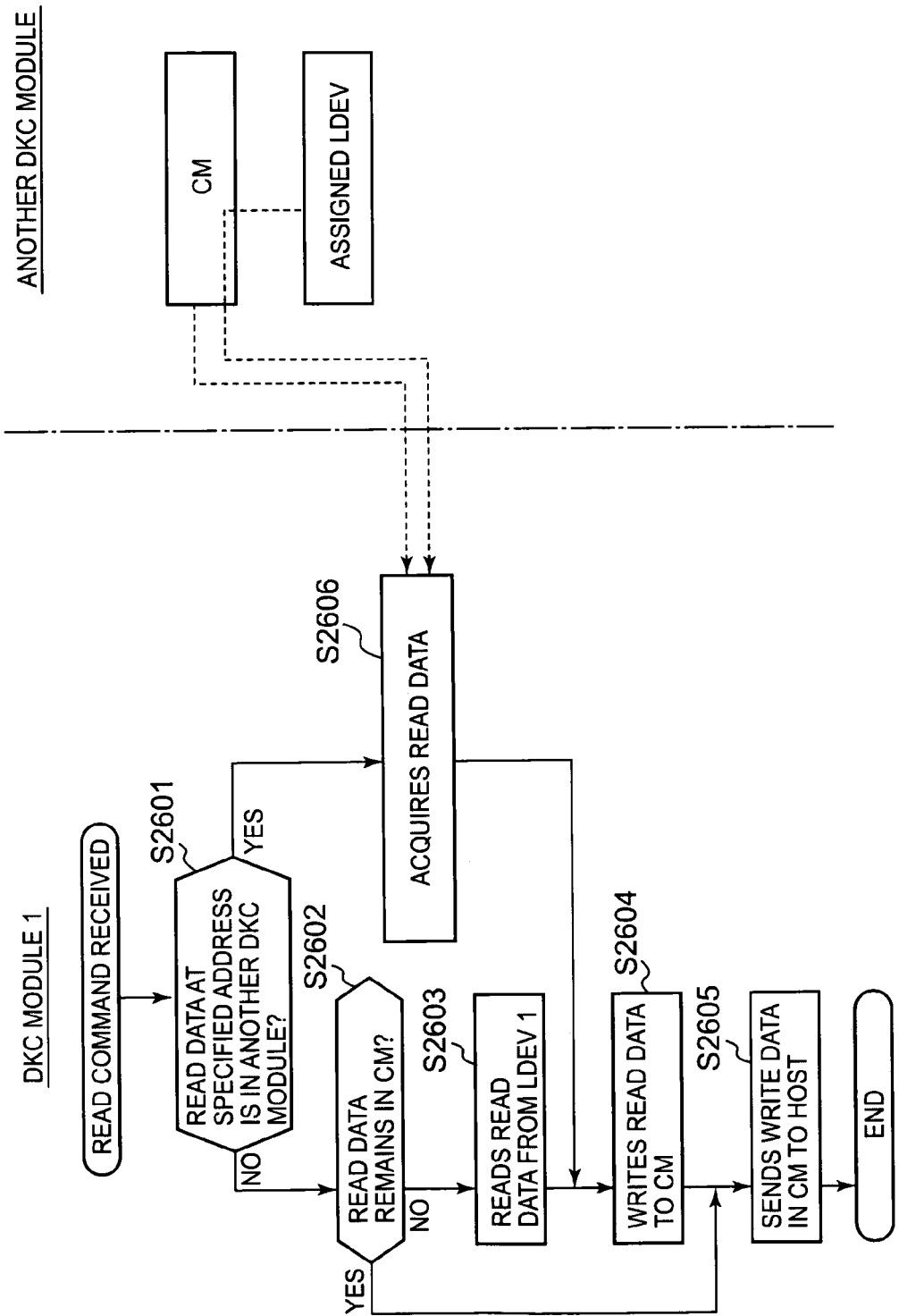

STORAGE SYSTEM TO BACKUP DIRTY DATA ELEMENTS USING A CACHE MEMORY

CROSS-REFERENCE TO PRIOR APPLICATION

This application relates to and claims the benefit of priority from Japanese Patent Application No. 2007-216019, filed on Aug. 22, 2007, the entire disclosure of which is incorporated herein by reference.

BACKGROUND

The present generally invention relates to the backup of data stored in a cache memory of a storage system.

As a technology on the backup of data stored in a cache memory, a technology disclosed in Japanese Patent Application Laid-Open No. 2002-99390, for example, is known. According to Japanese Patent Application Laid-Open No. 2002-99390, if power from the outside is shut down in a state where data, which has not yet been saved to a disk, exists in a cache memory, the data in the cache memory is copied to a non-volatile memory while a battery can supply power. After copying completes, power from the battery continues to the cache memory. When the power supply from the outside is restarted, the data stored in the cache memory is used if the power supply from the battery continues, or the data is restored from the non-volatile memory to the cache memory if the battery power has run down.

Recently the storage capacities of cache memories are increasing because of the increase in the capacities of memory chips constituting cache memories, and the higher performance of storage systems. Therefore there is concern over the increase of system down times. "System down time" is the time from the storage system stopping acceptance of I/O commands from a host device (e.g. host computer) to restarting the system. If the end of system down time, which was started at a certain point (e.g. time of power shut down, at which power from a primary power supply to the cache memory stopped due to a power failure, for example), is the completion of returning the data from the non-volatile storage resource to the cache memory, the time length required for this returning data (for convenience, returning data from the non-volatile storage resource to the cache memory is called "staging", and the time length required for the returning data is called "staging time length" in the following description) influences the length of the system down time. Since the storage capacities of cache memories are increasing, as mentioned above, the data volume of staging increases, and staging time length increases accordingly. As a result, the system down time becomes lengthy. Generally a storage system is demanded to be operational 24 hours/365 days non-stop, so as to present no hindrance to the work of the user, therefore a lengthy system time is a problem.

SUMMARY

With the foregoing in view, it is an object of the present invention to decrease the time length required for returning data from the non-volatile storage resource to the cache memory.

The other objects of the present invention will be clarified in the description herein below.

The present invention is a storage system comprising a plurality of control modules having a plurality of cache memories respectively. One or more dirty data element(s), out of a plurality of dirty data elements (data elements which have not been incorporated in the storage device) stored in a first cache memory in a first control module, is/are copied to a second cache memory in a second control module. The one or more dirty data element(s) stored in the second cache memory is/are backed up to a non-volatile storage resource. The dirty data elements backed up from the first cache memory to the non-volatile storage resource are dirty data elements, other than the one or more dirty data element(s) of which copying has completed, out of the plurality of dirty data elements.

BRIEF DESCRIPTION OF THE DRAWINGS

FIG. 3 shows a dirty data element copied from the CM in one DKC module 1 to the CMs of other DKC modules 2 to 4 respectively;

FIG. 5A shows the backup time length, recovery time length and system down time in a case of saving a dirty data element group stored in one CM to an SSD without dividing;

FIG. 5B shows the backup time length, recovery time length and system down time in a case of dividing a dirty data element group stored in one CM into four dirty sub-groups, and saving the four dirty sub-groups into four CMs respectively;

FIG. 6A shows a configuration example of a management information group;

FIG. 6B shows a configuration example of a dirty data element saved in an SSD;

FIG. 7A shows an example of dividing a dirty data element group in DKC module 1;

FIG. 7B shows a concept of copying an initial dirty sub-group from the DKC module 1 to other DKC modules 2 to 4;

FIG. 10A shows a concept of copying a difference dirty sub-group from DKC module 1 (and 2) to another DKC module 3 (and 4);

FIG. 10B shows a concept of a staging a dirty data element in DKC modules 1 to 4, and transferring a dirty data element from another DKC module 3 (and 4) to DKC module 1 (and 2);

FIG. 11 shows a first part of the flow of processing executed in an embodiment of the present invention;

FIG. 26 shows an example of the flow of processing executed when DKC module 1 receives a read command.

DESCRIPTION OF THE PREFERRED EMBODIMENTS

Figure 1A:
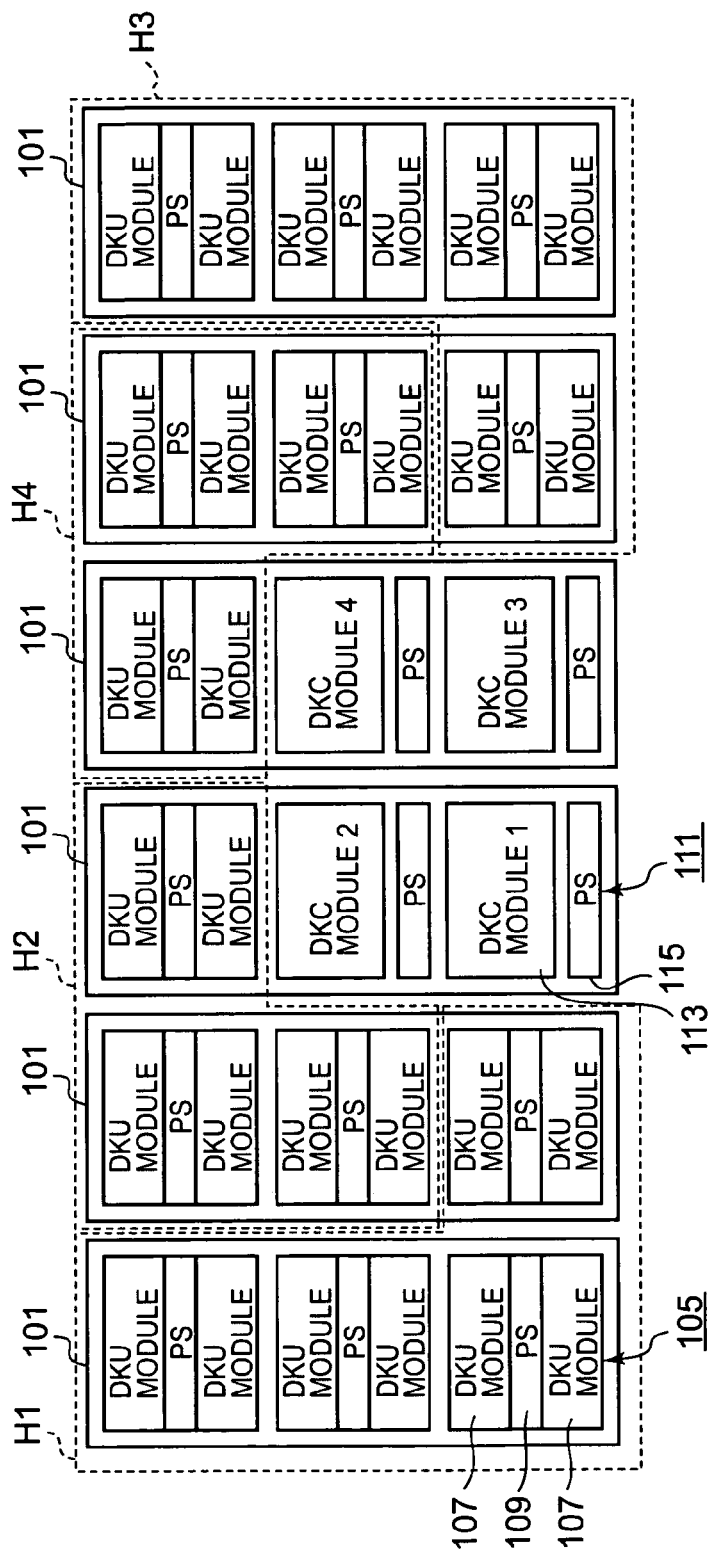
FIG. 1A shows an external front face of a storage system according to an embodiment of the present invention.

In Embodiment 1, a storage system comprises a plurality of storage devices and a plurality of control modules having a plurality of cache memories and a plurality of control units respectively. The storage system copies the one or more dirty data element(s) (data elements which have not be incorporated in the storage device) out of a plurality of dirty data elements stored in a first cache memory in a first control module to a second cache memory in a second control module. The one or more dirty data element(s) is/are backed up from the second cache memory to a non-volatile storage resource, and dirty data elements, other than the one or more dirty data element(s), are backed up from the first cache memory to the non-volatile storage resource.

In Embodiment 2 according to the Embodiment 1, one or more dirty data element(s) is/are copied to a second cache memory while power is being supplied from a primary power supply. If power is supplied from a battery after power supply from the primary power supply stops, the above mentioned backup operations are performed respectively.

In Embodiment 3 according to the Embodiment 2, wherein if a power failure is recovered and power is supplied again after a battery runs down (e.g. power supply from the battery stopped, or discharge voltage became lower than a predetermined threshold), the dirty data elements are staged from the non-volatile storage resource to the first cache memory, and the dirty data elements are staged from the non-volatile storage resource to the second cache memory, and the dirty data elements are copied from the second cache memory to the first cache memory in parallel with the staging.

In Embodiment 4 according to the Embodiment 3, the first control module creates management information to indicate a cache area, where a dirty data element exists, of the first cache memory and to indicate a control module to which the dirty data element is copied in the control module, and writes it to the first cache memory, and updates the management information as the copying of the dirty data elements completes. For backup, the storage system backs up the management information in addition to the dirty data element from the first cache memory to the non-volatile storage resource, and when power supply is restarted, the management information in addition to the dirty data element are staged from the non-volatile storage resource to the first cache memory.

In Embodiment 5 according to at least one of the Embodiments 1 to 4, the plurality of dirty data elements are evenly divided according to the total of the number of the first control modules and the number of the second control modules, with one or more provided for the first control modules. The dirty data element(s) acquired by this division is/are copied.

In Embodiment 6 according to at least one of the Embodiments 1 to 5, each control unit writes data according to an I/O command from the host device to the cache memory, and writes data written in the cache memory to at least one of the plurality of storage devices, or sends the data to the host device. The first control unit instructs the second control unit in the second control module to copy the above mentioned one or more dirty data element(s). The second control unit writes the one or more dirty data element(s) to the second cache memory in response to this instruction. By this, the one or more dirty data element(s) is/are copied from the first cache memory to the second cache memory.

In Embodiment 7 according to at least one of the Embodiments 1 to 6, the storage system further has a plurality of power supply modules, which are the power supplies of the plurality of control modules respectively. The number of second control modules is the number of first control modules or more, and one or more second control modules are provided for one first control module. The non-volatile storage resource severs as a plurality of non-volatile memory modules of a plurality of control modules respectively (e.g. a module having one or more non-volatile memory/memories). Each control module further has a connection unit for communicably connecting the cache memory and the control unit. The control modules are interconnected by the interconnection of the control units. The power supply module includes a battery and a primary power supply. The primary power supply supplies power to the cache memory and the control unit, and the battery supplies power to the cache memory and the control unit when the power from the primary power supply stops. The first control unit receives I/O commands from the host device while power is being supplied from the primary power supply. If the received I/O command is a write command, the first control unit writes a data element according to the write command to the first cache memory. The first control unit also creates the above mentioned management information, and writes it to the first cache memory. The first control unit sends an instruction, to copy one or more dirty data element(s), to the second control unit via two or more connection units including a first connection unit of the first control module and a second connection unit of the second control module. Then if a plurality of new dirty data elements exist in the first cache memory because of a plurality of data elements according to one or more write command(s) being written in the first cache memory, the first control unit sends an instruction, to copy one or more dirty data element(s) out of the new plurality of dirty data elements, to the second control unit via two or more connection units, and updates the management information as copying of the dirty data elements completes. While power is being supplied from the battery, after the power supply from the primary power supply stops, the second control unit backs up the dirty data elements written in the second cache memory, to the second non-volatile memory module of the second control module, stages the dirty data elements from the second non-volatile memory module to the second cache memory when the power supply is restarted, and sends an instruction to copy the staged dirty data elements to the first control unit via two or more connection units in parallel with the staging. While power is being supplied from the battery after the power supply from the primary power supply stops, the first control unit backs up the dirty data elements, other than the one or more dirty data element(s) of which copying has completed, and the management information from the first cache memory to the first non-volatile memory module of the first control module, stages the management information and the dirty data elements from the first non-volatile memory module to the first cache memory when the power supply from the primary power supply is restarted, and writes the dirty data elements staged in the second cache memory in the first cache memory. Then the first control unit integrates the dirty data elements written in the first cache memory and the staged dirty data elements, for example.

In Embodiment 8 according to at least one of the Embodiments 1 to 7, the first control unit sends an instruction to copy to the second control module while receiving the power from the primary power supply, and if the power from the primary power supply stops and power is received from the battery, the first control module backs up the dirty data elements from the first cache memory to the non-volatile storage resource without sending an instruction for copying.

In Embodiment 9 according to at least one of the Embodiments 1 to 8, a control module having a cache memory of which consumption ratio, which is a ratio of the total amount of dirty data elements to a storage capacity of the cache memory, is a first predetermined ratio or more, becomes the first control module. A control module having a cache memory, of which the consumption ratio is less than a second predetermined ratio, becomes the second control module.

In Embodiment 10 according to at least one of the Embodiments 1 to 9, the control modules are interconnected by the interconnection of the connection units.

In Embodiment 11 according to at least one of the Embodiments 1 to 10, when a write command is received from the host device, and if the consumption ratio of the first cache memory is a third predetermined ratio or more, the first control unit sends one or more data element(s) according to the write command to another control module (via two or more connection units, including a connection unit in another control module and the first connection unit), for example, and this other control module writes the one or more data element(s) to a cache memory in this other control module.

In Embodiment 12 according to at least one of Embodiments 1 to 11, two or more storage devices, out of the plurality of storage devices, are assigned to each control module respectively. Each logic volume is formed based on two or more storage devices, and each logical volume is a logical volume assigned to each control module. When the first control unit receives a write command from the host device and if the open status of the assigned logical volume for the first control unit itself, specified by the write command, is worse than a predetermined status, then the first control unit sends one or more data element(s) according to the write command to another control module (via two or more connection units including a connection unit in this other control module and the first connection unit), for example. This other control module writes the one or more data element(s) to a cache memory of this control module, and writes the one or more data element(s) written in the cache memory to a logical volume assigned to this control module.

In Embodiment 13 according to at least one of the Embodiments 1 to 12, if a new plurality of dirty data elements exist in the first cache memory because a plurality of data elements according to one or more write commands are written in the first cache memory after the instruction to copy one or more dirty data element(s) is/are sent, the first control unit sends an instruction to copy one or more dirty data element(s) out of the plurality of new dirty data elements to the second control module.

In Embodiment 14 according to at least one of the Embodiments 1 to 13, the second control unit backs up the dirty data elements copied in the second cache memory to the non-volatile storage resource, stages the dirty data elements from the non-volatile storage resource to the second cache memory, and sends an instruction to copy the staged dirty data elements to the first control module in parallel with the staging. The first control unit stages the management information and dirty data elements from the non-volatile storage resource to the first cache memory, and writes the dirty data elements from the second control module to the first cache memory responding to the instruction of copying.

Some embodiments of the present invention will now be described in detail with reference to the drawings. In the following description, the data stored in a plurality of physical or logical storage areas (e.g. segments) constituting the cache memory respectively, that is, the data stored in one storage area, is called a "data element". For example, if write data according to one write command is written to a cache memory, one or more write data element(s) constituting the write data exist(s) in the cache memory.

FIG. 1A shows an external front face of a storage system according to an embodiment of the present invention.

The storage system 100 is comprised of a plurality of module packages. The module package includes a power supply module for supplying power to predetermined composing elements in this module package, and is installed in a body 101 which can mount three (three or more, or less is acceptable) module packages.

Examples of the module package is DKU (DisK Unit) module package 105 and DKC (DisK Controller) module package 111. In the body 101, only DKU module packages 105 may be mounted or only DKC module packages 111 may be mounted, or both DKU module packages 105 and DKC module packages 111 may be mounted. The mounting location on the body 101 and the kind of modules to be mounted may be defined in advance, or may be undefined.

The DKU module package 105 has two DKU modules 107 and one power supply module 109, for example. The DKU module 107 includes a plurality of disk devices. For the disk device, the drive of a hard disk or non-volatile disk type storage media, such as DVD (Digital Versatile Disk) is used (this is not limited to a disk type storage media, but a drive of another type of storage media, such as a non-volatile semiconductor memory (e.g. flash memory) may be used). A RAID group is formed by two or more disk devices out of the plurality of disk devices. Based on the storage space of a RAID group, one or more logical storage device(s) (hereafter called "LDEV") is/are formed. The LDEV can be called a logical volume or a logical unit. The power supply module 109 will be described later.

Figure 1B:
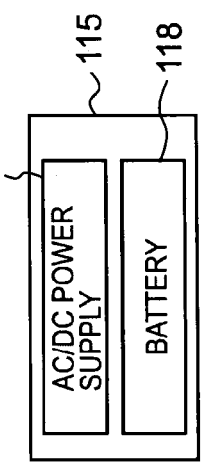
FIG. 1B shows a configuration example of a power supply module.

The DKC module package 111 has a DKC module 113 and a power supply module 115. The DKC module 113 will be described later. The power supply module 115 includes, as FIG. 1B shows, an AC/DC power supply (primary power supply) 116 for converting AC power from an external power supply (e.g. commercial power supply) into DC power and supplying it, and a battery (secondary power supply) 118 for supplying DC power to predetermined composing elements instead of the AC/DC power supply 116 when the supply of DC power from the AC/DC power supply 116 stops, due to a power failure, for example. The AC/DC power supply 116 supplies power to individual composing elements (later mentioned FE-PK, BE-PK, MP-PK and CM-PK) in the DKC module 113 in the DKC module package 111 including this AC/DC power supply 111. The battery 118 supplies power to at least elements that require backup (e.g. CM-PK and SSD) for the dirty data elements (data elements not yet written in the disk device) from the CM (cache memory) to SSD, of the DKC module 113 in the DKC module package 111 including the battery 118. A power supply module 109 in the DKU module package 105 has only an AC/DC power supply for supplying DC power to each disk device, and does not have a battery, unlike the power supply module 115.

For each DKC module 113, assigned DKU modules 107, that is, the DKU modules 107 connected to a later mentioned BE-PK in the DKC module 113, are defined in advance. For example, in the present embodiment, there are four DKC modules 113 (hereafter referred to by serial numbers 1, 2, 3 and 4 for convenience), and the DKU module 107 in the range enclosed by the dotted line H1 is assigned to the DKC module 1, the DKU module 107 in the range enclosed by the dotted line H2 is assigned to the DKC module 2, the DKU module 107 enclosed by the dotted line H3 is assigned to the DKC module 3, and the DKU module 107 enclosed by the dotted line H4 is assigned to the DKC module 4. The DKC modules 1 to 4 can also access the DKU modules assigned to other DKC module 1 to 4 respectively. Details will be described later. The number of DKC modules 113 may be more or less than 4.

Figure 2:
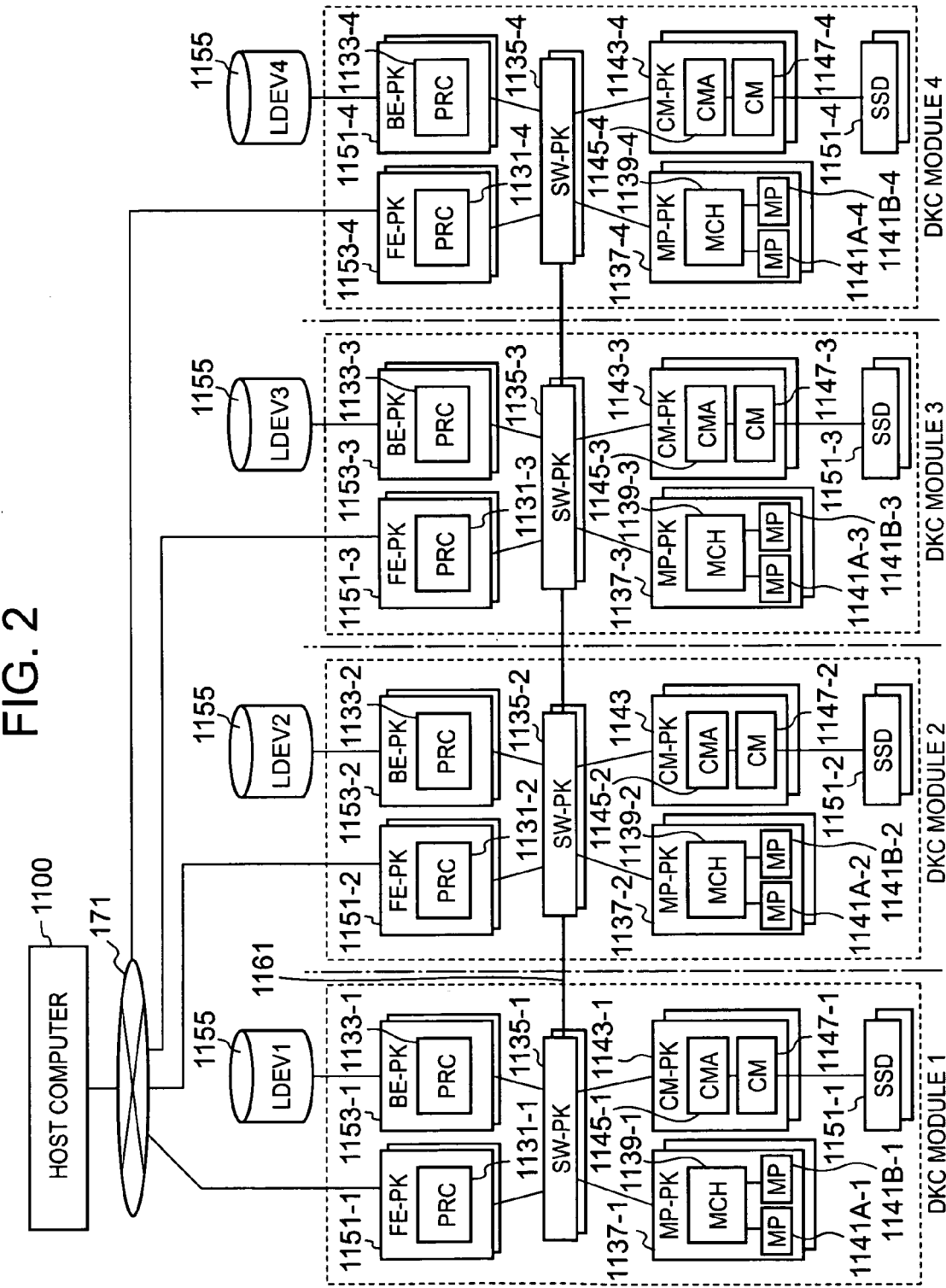
FIG. 2 shows a configuration of four DKC modules 1 to 4 and the relationships thereof.

FIG. 2 shows the configuration of the four DKC modules 1 to 4 and the relationship thereof.

The configurations of the DKC modules 1 to 4 are virtually the same. Each configuration of the DKC module 1 to 4 will now be described using DKC module 1 as an example. The reference number of a composing element in a DKC module is assigned by a primary number and a serial number of the DKC module, and this combination of primary number and serial number is used in the description if the same type of composing elements are distinguished, and only a primary number is used if the same type of composing elements are not distinguished. For example, only the primary number 1151 is used to indicate an FE-PK of a DKC module, 1151-1 is used to indicate the FE-PK of the DKC module 1, and 1151-2 is used to indicate the FE-PK in the DKC module 2. It is assumed that LDEVs 1 to 4 are formed using the DKU module 107 assigned to the DKC modules 1 to 4 respectively. Therefore it is assumed that LDEV 1 is assigned to the DKC module 1, LDEV 2 is assigned to the DKC module 2, LDEV 3 is assigned to the DKC module 3, and LDEV 4 is assigned to the DKC module 4.

The DKC module 1 has FE-PK (Front End-Package) 1151-1, BE-PK (Back End-Package) 1153-1, MP-PK (Microprocessor-Package) 1137-1, CM-PK (Cache Memory-Package) 1143, SSD (Solid State Device) 1151-1 and SW-PK (Switch-Package) 1135-1. These composing elements are duplicated respectively.

The FE-PK 1151-1 is a circuit board for controlling communication with a host computer 1100, such as receiving from the host computer 1100 I/O commands (write command/read command) via a communication network 171 or sending read data (data according to a read command) to the host computer 1100. The FE-PK 1151-1 has a protocol chip ("PRC" in FIG. 2) 1131-1 for performing protocol conversion processing in communication with the host computer 1100. When an I/O command is received, the FE-PK 1151-1 notifies the reception of the I/O command to a first MP (MicroProcessor) 1141A-1 in the MP-PK 1137-1 via an SW-PK 1135-1. If the received I/O command is a write command, the FE-PK 1151-1 stores the data according to the write command (hereafter "write data") to a storage resource (e.g. memory), which is not illustrated, in the FE-PK 1151-1.

The MP-PK 1137-1 is a circuit board which has a first MP 1141A-1 for performing front end processing (processing for the host computer 1100); a second MP 1141B-1 for performing back end processing (processing for LDEV), and an MCH (Memory Controller Hub) 1139-1 for connecting the first MP 1141A-1 and the second MP 1141B-1. As the front end processing, the first MP 1141A-1 receives notice about reception of a write command from the FE-PK 1151-1, acquires the write data from the host computer 1100 via the FE-PK 1139-1, and writes the acquired write data to CM 1147-1, for example. Also as the front end processing, the first MP 1141A-1 receives a notice about reception of a read command from the FE-PK 1151-1, checks whether the target read data exists in a CM 1147-1, reads the read data from the CM 1147-1 if it exists, and sends it to the FE-PK 1139-1 (that is, sends it to the host computer 1100 via the FE-PK 1139-1), or has a second MP 1141B-1 read a read data from the LDEV 1 if it does not exist, reads the read data, which was read and stored in the CM 1147-1, from the CM 1147-1, and sends it to the host computer 1100 via the FE-PK 1139-1, for example. As the back end processing, the second MP 1141B-1 reads write data from the CM 1147-1, and sends this write data and information to indicate a write destination thereof (e.g. disk device corresponding to the LDEV 1 and write destination address thereof) to the BE-PK 1153-1 (that is, writes the write data to the LDEV 1 via the BE-PK 1153), or reads read data from the LDEV 1 via the BE-PK 1153-1 and writes it to the CM 1147-1.

The BE-PK 1153-1 is a circuit board for controlling communication with each disk device connected to the BE-PK 1153-1, such as writing write data, which the second MP 1141B-1 read from the CM 1147-1, to the LDEV 1, or reading read data from the LDEV 1. The BE-PK 1153-1 has a protocol chip ("PRC" in FIG. 2) 1133-1 for performing protocol conversion processing in communication with a disk device.

The CM-PK 1143-1 is a circuit board having a CM (Cache Memory) 1147-1, which is a volatile memory, and a CMA (Cache Memory Adapter) 1145-1, which is an interface for reading or writing data from/to the CM 1147-1.

The SSD is a composite module having a plurality of non-volatile memories (e.g. a plurality of flash memories).

The SW-PK 1136-1 is a switch circuit board for controlling communication among the FE-PK 1151-1, BE-PK 1153-1, MP-PK 1137-1 and CM-PK 1143. The FE-PK 1151-1, BE-PK 1153-1, MP-PK 1137-1 and CM-PK 1143 are connected to the SW-PK 1136-1. The SW-PK 1136-1 is also connected with an SW-PK 1136 of another DKC module via a link (e.g. cable) 1161.

In other words, the DKC module 1 is connected so as to exchange data with other DKC modules 2 to 4. The DKC modules may be interconnected by the interconnection of FE-PKs, but the interconnection of SW-PKs is used in the present embodiment, as mentioned above.

Figure 4A:
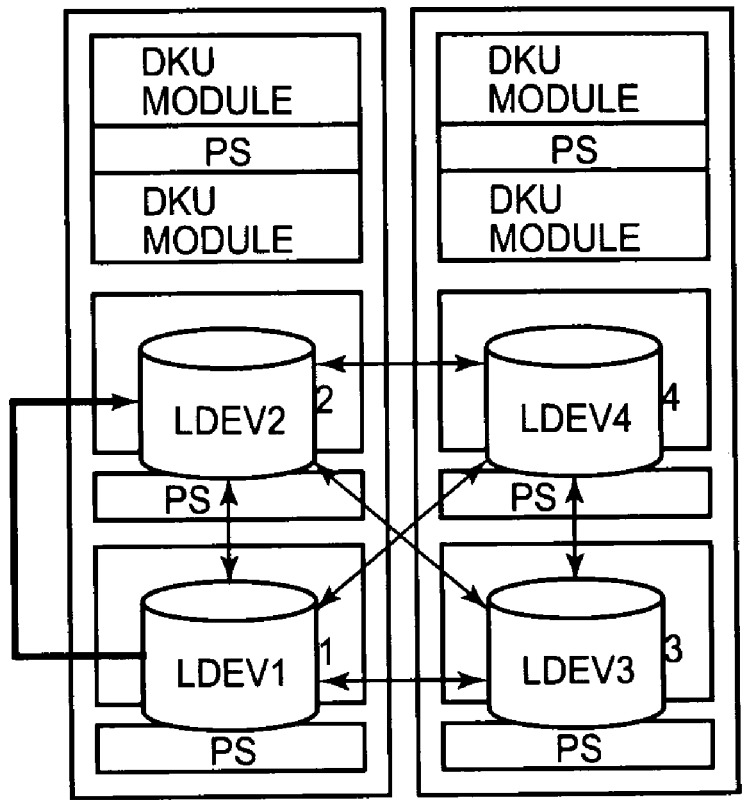
FIG. 4A shows a concept of data copying among DKC modules.
Figure 4B:
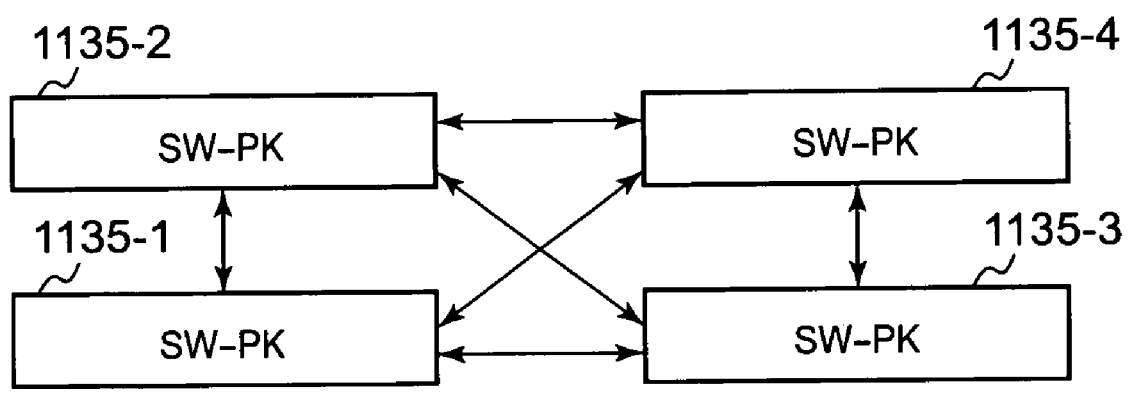
FIG. 4B shows an example of the interconnection of SW-PKs in DKC modules 1 to 4.

For example, as FIG. 4B shows, SW-PK 1135-1 to 1135-4 are connected to all the other SW-PKs respectively. Because of this, no matter which DKC module 113 uses a CM 1147 of any other DKC module 113 or LDEV 1155 assigned to any other DKC module 113, the DKC module 113 can send via a link 1161 or another SW-PK 1135 an instruction to the MP-PK 1137 in another DKC module 113 to which CM 1147 to be used or LDEV 1155 to be used is assigned.

Figure 25:
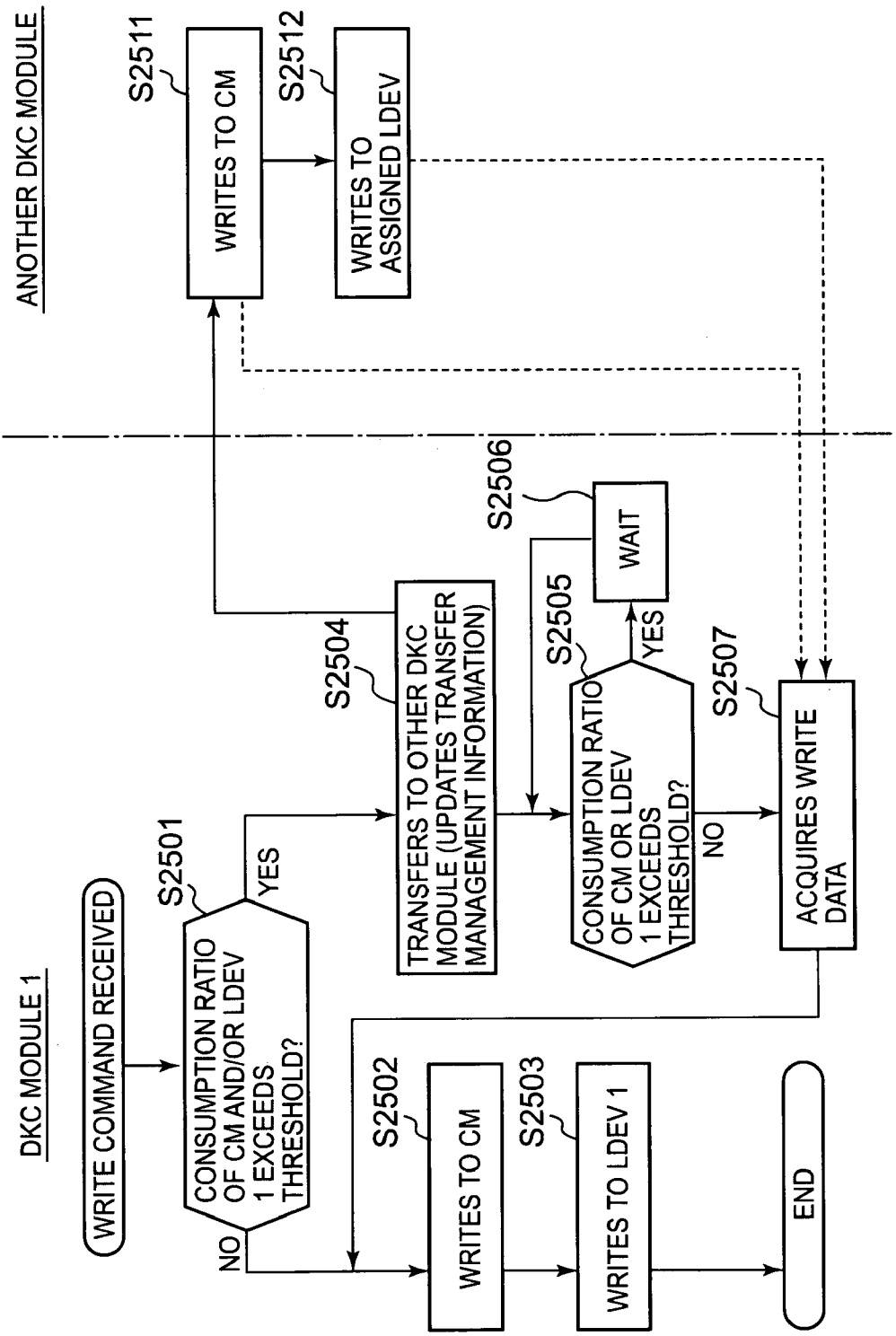
FIG. 25 shows an example of the flow of processing executed when DKC module 1 receives a write command.

For example, if the DKC module 1 receives a write command specifying the LDEV 1 from the host computer 1100, as FIG. 25 shows, the MP-PK 1137-1 judges whether the consumption ratio of the LDEV 1 (ratio of consumed storage capacity to the storage capacity of LDEV 1) exceeds a first threshold, and/or the consumption ratio of the CM 1147-1 (ratio of total amount of dirty data elements to the storage capacity of the CM 1147-1) exceeds a second threshold (S2501). If it is judged that the consumption ratio of the LDEV 1 does not exceed the first threshold and/or the consumption ratio of the CM 1147-1 does not exceed the second threshold (NO in S2501), then the MP-PK 1137-1 writes the write data according to the write command to the CM 1147-1 (S2502), reads this write data from the CM 1147-1, and writes it to the LDEV 1 (S2503). If it is judged that the consumption ratio of the LDEV 1 exceeds the first threshold and/or the consumption ratio of the CM 1147-1 exceeds the second threshold (YES in S2501), then the MP-PK 1137-1 transfers the write command to another DKC module (e.g. DKC module 2), and records the transfer of the address specified by the received write command (e.g. ID of LDEV or LBA (Logical Block Address)) to another DKC module (e.g. DKC module 2) in a transfer management information (information to indicate a DKC module to which an address data is transferred, and information stored in a memory in the MP-PK 1137-1, for example) (S2504). In the other DKC module which became the transfer destination, the consumption ratio of the assigned LDEV is the first threshold or less, and/or the consumption ratio of the CM is the second threshold or less, and this information can be known by the MP-PK 1137-1 having each of the other DKC modules notify the consumption ratio of the assigned LDEV and/or consumption ratio of the CM periodically. The MP-PK in the other DKC module which received the CM write command writes the write data according to the received write command to the CM (S2511), and writes this write data to the assigned LDEV (S2512). The MP-PK in the other DKC module writes an address management information to indicate the address of the write data and the write destination thereof to the storage resource in this other DKC module. Then the MP-PK 1137-1 of the DKC module 1 waits until the consumption ratio of the LDEV 1 becomes the first threshold or less, and or the consumption ratio of the CM 1147-1 becomes the second threshold or less (YES in S2505, and S2506), and if the consumption ratio of the LDEV 1 becomes the first threshold or less and/or the consumption ratio of the CM 1147-1 becomes the second threshold or less (NO in S2505), the MP-PK 1137-1 acquires the write data from the other DKC module at the transfer destination based on the transfer management information (S2507), and performs processing after S2502. In S2507, the MP-PK 1137-1 can acquire the transferred write data by notifying the acquired address of the write data to the other DKC module and the MP-PK in the other DKC module referring to the address management information, acquiring the write data from the location corresponding to the notified address and transferring it to the DKC module 1.

Also, for example, if the DKC module 1 receives a read command specifying the LDEV 1 from the host computer 1100, as FIG. 26 shows, the MP-PK 1137-1 judges whether the read data, which is supposed to exist in an address specified by the read command, exists in another DKC module by referring to the transfer management information (S2601). If it is judged that the read data exists in the DKC module 1 (NO in S2601), the MP-PK 1137-1 sends the read data in the CM 1147-1 to the host (S2605) if this read data remains in the CM 1147-1 (YES in S2602), and if this read data does not remain in the CM 1147-1 (NO in S2602), the MP-PK 1137-1 reads the read data from the specified address (block in LDEV 1), and writes it in the CM 1147-1 (S2603 and S2604), and sends the read data in the CM 1147-1 to the host (S2605). If it is judged that the read data is in another DKC module (e.g. DKC module 2) as a result of the judgment in S2601 (YES in S2601), then the MP-PK 1137-1 acquires the read data from the other DKC module (S2606), and performs processing in S2604 and later. For example, in S2606, the MP-PK 1137-1 notifies the address specified by the read command to the other DKC module, the MP-PK in the other DKC module refers to the address management information, reads the read data from a location corresponding to the notified address (reads the read data from the CM if it remains in the CM, or reads the read data from the assigned LDEV and writes it to the CM, and reads this read data from the CM if the read data does not remain in the CM), and transfers the read data to the DKC module 1, then the MP-PK 1137-1 can acquire the read data from the other DKC module.

The interconnection of SW-PKs 1135 is not limited to the example in FIG. 4B, but one SW-PK 1135 may be connected with at least one other SW-PK 1135. In other words, a DKC module 113 may use the CM 1147, or the assigned LDEV 1155 of the other DKC module 113 via a plurality of links 1161 and plurality of SW-PKs 1135. For example, in FIG. 4B, the SW-PK 1135-1 and the SW-PK 1135-3 do not have to be interconnected. In this case, if the DKC module 1 uses the CM 1135-3, the CM 1135-3 connected to the SW-PK 1135-3 can be used via the SW-PK 1135-2.

Hereafter the coupling between PKs (packages) of the FE-PK 1151, BE-PK 1153, MP-PK 1137 and CM-PK 1143 implemented by the SW-PK 1135 may be called a "close coupling", and the coupling between the SW-PKs 1135 may be called a "loose coupling". This is because the data exchange between PKs within one DKC module 113, which is performed via the SW-PK 1135 and not via a coupling between the SW-PKs 1135 (link 1161), can be performed at high-speed, and the data exchange between DKC modules 113, which is performed not only via the SW-PK 1135 but also via a coupling between the SW-PKs 1135, is slower than the data transfer speed within the DKC module 113. In other words, close coupling refers to a coupling with which the data transfer speed is fast (that is, coupling implemented by the SW-PK 1135), and loose coupling refers to a coupling with which the data transfer speed is slower (that is, coupling implemented by the link 1161).

In this storage system 100, each DKC module 113 can mount the SSD 1151-1 to 1151-4 and dirty data elements in the CM 1147 can be copied between the DKC modules 113, as mentioned above. There are some possible cases where this copying is performed, and the following (case A) and (case B) are examples.

(Case A) Dirty data elements stored in the CM 1147 of one DKC module 113 out of the plurality of DKC modules 113 exceed a predetermined consumption ratio, and the total amount of dirty data elements in the CMs 1147 in one or more other DKC modules 113 is less than a predetermined consumption ratio.

(Case B) Dirty data elements stored in the CM 1147 of two or more DKC modules 113 out of the plurality of DKC modules 113 exceed a predetermined consumption ratio, and the total amount of dirty data elements in the CMs 1147 in two or more other DKC modules 113 is less than a predetermined consumption ratio.

(Case A) is generated by the following causes, for example.

I/Os are concentrated to the LDEV 1155 assigned to one DKC module 113. This LDEV 1155 may be an LDEV existing in the storage system 100, or an external LDEV corresponding to a virtual LDEV provided by the storage system 100 (LDEV created based on the external storage of the storage system 100) using a virtual storage technology.

In an LDEV 1155 in a RAID5 (3D+1P) configuration, one disk device causes a problem, and, as background processing, the processing to restore the data stored in this disk device to a spare disk (may be called a "collection copy"), that is recalculation of parity, is being executed.

A job for equalizing the load of the disk devices is running on the LDEV 1155 assigned to the DKC module 113.

(Case B) is generated by the following cause, for example.

A copy related application program is being executed in the storage system 100. For example, the data in a primary LDEV 1155, of the storage system 100, is being copied to a secondary LDEV 1155 without going through the host computer 1100.

As described above, in this storage system 100, when the consumption ratio of the CM 1147 in the DKC module 113 (ratio of total amount of dirty data elements to the storage capacity of the CM 1147) exceeds a predetermined set value, dirty data elements stored in the CM 1147 in one (case A) or two or more (case B) DKC module(s) 113 is/are copied to the CM 1147 of another DKC module 113 using coupling (loose coupling) between DKC modules 113 via the SW-PK 1135. This processing is executed as a background processing, transparent to the user of the storage system 100 (that is, the user of the host computer 1100). The dirty data elements of which copying has completed, existing in the copy source DKC module 113, remain in the CM 1147 in this DKC module 113 after copying completes. This is to maintain the access speed to access the data in the CM 1147 (for accessing data in the CM 1147 in the other DKC module 113, which occurs via coupling between SW-PKs (loose coupling), the access speed slows and the I/O performance drops).

FIG. 3 shows a data flow in (case A), that is, the data flow when the dirty data elements in the CM 1147-1 in the DKC module 1 are copied to the CM 1147-2 to 1147-4 in the DKC modules 2 to 4, as an example. A group formed by a plurality of dirty data elements in the CM 1147-1 in the DKC module 1 is divided into four sub-groups (a set of one or more dirty data elements) (hereafter the sub-group is called "dirty sub-group"), and these divided first to fourth dirty sub-groups are assigned to the DKC modules 1 to 4 respectively. In the case of this example, the first dirty sub-group is managed by the second MP 1141B-1 of the DKC module 1, the second to fourth dirty sub-groups are sent to the second MP 1141B-2 to 1141B-4 of the other DKC modules 2 to 4 respectively via the coupling between the SW-PKs 1135 by the second MP 1141B-1, and written to the CM 1147-2 to 1147-4 by the second MP 1141B-2 to 1141B-4 respectively. By this, the second to fourth dirty sub-groups in the CM 1147-1 are copied to the CM 1147-2 to CM 1147-4 respectively (in FIG. 3, it appears that the fourth dirty sub-group is copied to the CM 1147-4 via three links 1161 or three SW-PKs 1135-2 to 1135-4, but according to the connection shown in FIG. 4B, the fourth dirty sub-group can be copied to the CM 1147-4 via one link 1161 and one other SW-PK 1135-4, without going through SW-PK 1135-2 and 1135-3). In the CM 1147-1 in the DKC module 1, the later mentioned management information group is stored.

FIG. 4A shows a data flow in (case B), that is the concept of copying data between the DKC modules 113 in the storage system 100 as an example. It is assumed that the LDEV 1 is a primary LDEV and the LDEV 2 is a secondary LDEV. In this case, the write data to the primary LDEV 1 is duplicated in the CM 1147-1, where one write data is written to the primary LDEV 1, and the other write data is copied from the CM 1147-1 to the CM 1147-2, and is then written from the CM 1147-2 to the secondary LDEV 2. This means that one or more dirty data element(s) constituting the write data is/are stored in the CM 1147-1 and 1147-2 in the two DKC modules 1 and 2. In the case B, a group formed by a plurality of dirty data elements in the CM 1147-1 is divided (e.g. evenly divided) into the first and second dirty sub-groups, and a group formed by a plurality of dirty data elements in the CM 1147-2 is divided (e.g. evenly divided) into the third and fourth dirty sub-groups. Then the second dirty sub-group is copied from the CM 1147-1 in the DKC module 1 to the CM 1147-3 in the DKC module 3, and the fourth dirty sub-group is copied from the CM 1147-2 in the DKC module 2 to the CM 1147-4 in the DKC module 4. The management information group is stored in the CM 1147-1 and CM 1147-2 respectively.

FIG. 6A shows a configuration example of the management information group. The management information group 200 shown in FIG. 6A is a management information group in (case A).

The management information group 200 includes a first management information 201A and a second management information 201B.

The first management information 201A is information for management, such as information on a cache area (e.g. segment) of the copy source CM 1147 where a dirty data element (composing element of copy target dirty sub-group) is stored, a cache area of the CM 1147 in a DKC module 113 where the dirty data element is copied to, and information on whether the copying completed, whether the backup of the dirty data element is necessary, and whether saving data to the SSD 1151 is completed. Specifically, the first management information 201A includes a copy completion flag (flag to indicate whether copy completed), a copy source information (information comprised of an ID (identifier) of the copy source DKC module 113 and a cache address which is an address of the copy source cache area), copy destination information (information comprised of an ID of the copy destination DKC module 113 and a cache address of the copy destination cache area), backup necessity (information to indicate whether backup of the dirty data element stored in the corresponding copy source is necessary), and a save completion flag (flag to indicate whether saving completed).

The second management information 201B is information for managing a completed job and incompleted job in the copy source and copy destination DKC modules. FIG. 6A shows the management information group 200 in (case A), as mentioned above, s job management information elements to indicate a completed job and incompleted job are included for all DKC modules 1 to 4 as the copy source and copy destination DKC modules, but in (case B), if the DKC module 1 is a copy source and the DKC module 3 is a copy destination, for example, the job management information elements on DKC modules 2 and 4 are not included in the second management information 201B in the management information group 200 managed by the DKC module 1.

The flow of the processing performed in the present embodiment will now be described in detail with reference to FIG. 11 to FIG. 24.

As FIG. 11 shows, it is judged whether the second MP 1141B-1 in the DKC module x (here x is an integer of 1 to 4, in the following description it is assumed that x=1, just like the above mentioned example, to simply description) has stored dirty data elements in the CM 1147-1 exceeding a first specified ratio (S1100). This judgment can be performed by referring to the cache management information, for example. The cache management information is information for controlling data storage for the CM 1147-1, and includes information on a cache address, cache area attribute (e.g. clean, dirty or free), and distance from LRU (Least Recently Used).

The cache area attribute "clean" refers to a cache area where clean data elements (e.g. composing elements of read data), which are data elements already stored in the disk device, are stored, "dirty" refers to a cache area where dirty data elements are stored, and "free" refers to an unassigned cache area where either dirty data elements or clean data elements can be stored.

If it is judged that dirty data elements are stored in the CM 1147-1 exceeding a first predetermined ratio (YES in S1100), the second MP 1141B-1 judges whether the total amount of stored dirty data elements is less than a second predetermined ratio or not for all the CM 1147-2 to 1147-4 of the DKC module n (here n is an integer of 1 to 4 excluding x, and here it is assumed that n=2, 3 and 4, just like the above mentioned example) (S1100). The judgment in S1100 can be performed by the second MP 1141B-1 receiving the above mentioned cache management information from the second MP 1141B-2 to 1141B-4 in all other DKC modules 2 to 4 periodically or at this point, and referring to this cache management information. If it is judged that the total amount of dirty data elements is less than the second predetermined ratio in all other DKC modules 2 to 4 (YES in S1101), then S1104 is performed, and if it is judged that the total amount of the dirty data elements is the second predetermined ratio or more in at least one DKC module 2, 3 or 4 (NO in S1101), then S1102 is performed. Processing after S1102 will be described later.

In S1104, the second MP 1141B-1 evenly divides the dirty data element group in the CM 1147-1 into four. As a result, the first to fourth initial dirty sub-groups (initial dirty sub-group A1 to A4) are acquired.

A1: $D_{x-1}(t)$
A2: $D_{x-2}(t_0)+\Delta D_{x-2}(t)$
A3: $D_{x-3}(t_0)+\Delta D_{x-3}(t)$
A4: $D_{x-4}(t_0)+\Delta D_{x-4}(t)$ Here $t_0$ is the time point in S1104. t is a current time point which is constantly advancing. Therefore $D_{x-2}(t_0)$ to $D_{x-4}(t_0)$ are dirty sub-groups acquired by dividing the dirty data element group at time point to into four (hereafter called first dirty sub-groups). $\Delta D_{x-2}(t)$ to $D_{x-4}(t)$ are dirty sub-groups acquired by dividing the dirty data element group stored from time point $t_0$ to current time point t into four (hereafter called second dirty sub-groups). $D_{x-1}(t)$ is a sub-group of the dirty data element group at time point to and a dirty data element group from time point to current time point t. $\Delta D_{x-2}(t)$ to $\Delta D_{x-4}(t)$ and $D_{x-1}(t)$ are data which increase each time a predetermined number (e.g. 4) of dirty data elements are stored in the CM 1147-1 according to the progress of the current time point t. In other words, the copy source DKC module 113 does not copy the dirty sub-group after receiving of I/O commands from the host computer 1100 is stopped, but copies the dirty sub-group while performing processing, to receive an I/O commands or processing, to write the dirty data elements in the CM 1147 to the disk device (in other words, in online status).

Then in S1105, the second MP 1141B-1 assigns the initial dirty sub-groups A1 to A4 to the DKC modules 1 to 4 respectively. The result of this assigning is shown in the drawing.

In S1106, the second MP-1141B-1 stores the management information group 200 to the CM 1147-1. As a result, four initial dirty sub-groups and the management information group 200 are stored in the CM 1147-1, as shown in the example in FIG. 7A. At this point, the DKC module 1 becomes the master, and the other DKC modules 2 to 4 become the slaves respectively.

Figure 12:
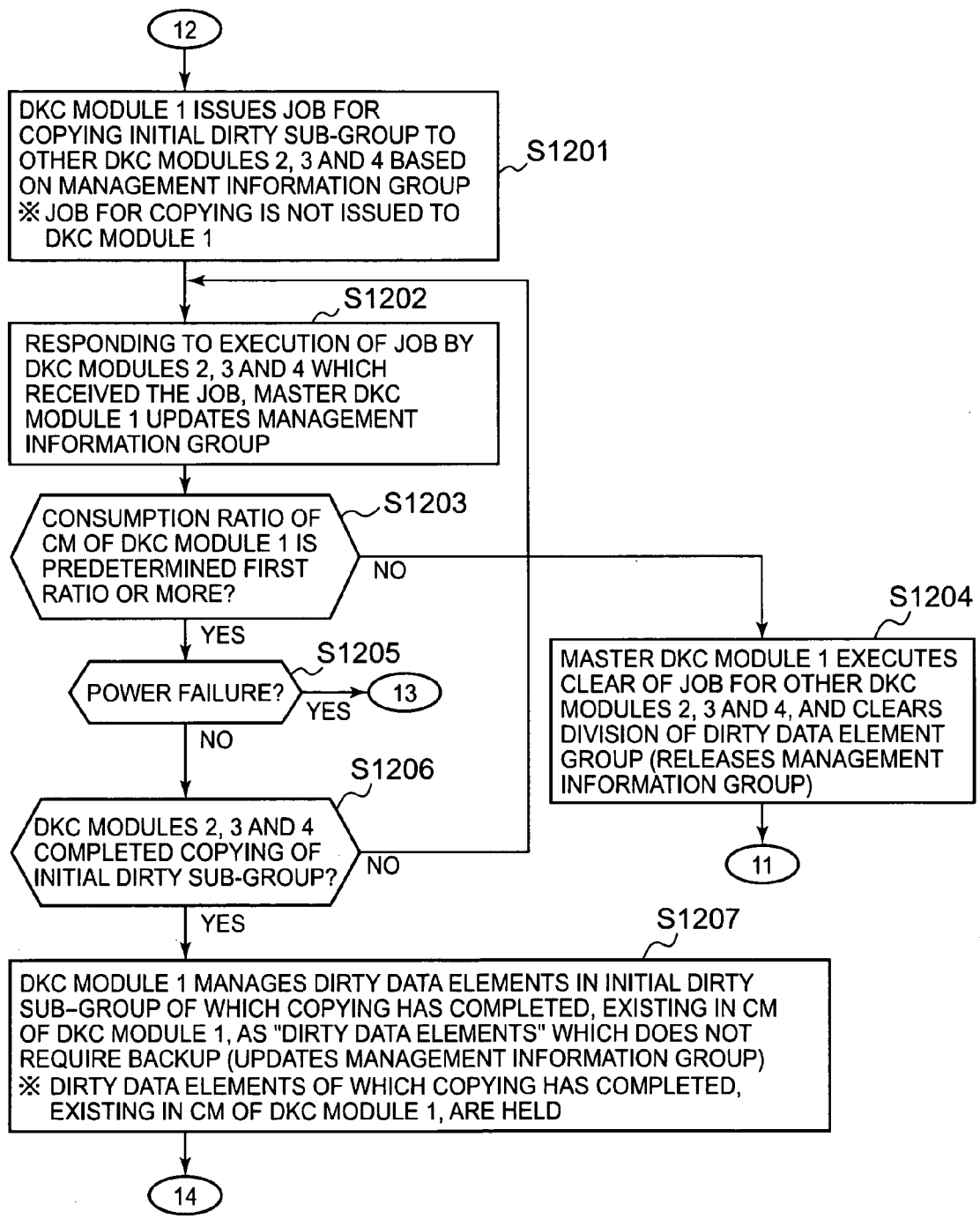
FIG. 12 shows a second part of the flow of processing executed in an embodiment of the present invention.

Then in S1201 in FIG. 12, the second MP 1141B-1, on the basis of the management information group 200, issues a job group to copy the assigned initial dirty sub-groups A2 to A4 respectively to the second MPs 1141B-2 to 1141B-4 of all the slave DKC modules 2 to 4 (see FIG. 7B). For example, the job group to be issued to the second MP 1141B-2 of the slave DKC module 2 includes a job to indicate a cache area of the CM 1147-2 (e.g. free or clean cache area specified based on the cache management information on CM 1147-2), and a dirty data element to be written in this cache area. Every time a job is executed, the second MP 1141B-2 replies with a completion of the job and the ID of the job to the second MP 1141B-1 in the master DKC module 1.

The second MP 1141B-1 updates the management information group 200 as a job is executed in each slave DKC module 2 to 4 (e.g. as the job completes and the ID of the job is received) (S1201). For example, if the above mentioned reply is received from the DKC module 2, the second MP 1141B-1 updates the completion flag of the copied dirty data element from "not complete" to "complete" in the first management information 201A, and updates the job management information elements on the DKC module 2 in the second management information 201B.

The second MP 1141B-1 judges whether the dirty data elements are stored in the CM 1147-1 exceeding the first predetermined ratio, based on the cache management information and the management information group 200 after update (S1203). For example, if the dirty data element constituting the dirty sub-group A1 becomes a clean data element by being stored in the LDEV 1 assigned to the DKC module 1, it is possible that the consumption ratio in the CM 1147-1 is low.

If the judgment result is "not stored" in S1203 (NO in S1203), the second MP 1141B-1 instructs other second MPs 1141B-2 to 1141B-4 to clear the job group, clear the division of the dirty data element group, and releases the management information group 200 (e.g. discards) (S1204). Then the processing returns to S1100 in FIG. 11.

If the judgment result in S1203 is "stored" (YES in S1203), and if no power failure occurred (NO in S1205), the second MP 1141B-1 judges whether copying of the initial dirty sub-groups A2 to A4 has completed in all the slave DKC modules 2 to 4 (S1206). If the judgment result shows that copying of the initial dirty sub-group has not been completed in at least one slave DKC module 2, 3 or 4 (NO in S1206), the processing returns to S1202, and if the judgment result shows that copying of the initial dirty sub-group has been completed in all the slave DKC modules 2 to 4 (YES in S1206), the processing advances to S1207. IF a power failure occurs after YES in S1203 (YES in S1205), the processing advances to S1301 in FIG. 13 (processing after S1301 will be described later).

In S1207, the second MP 1141B-1 updates the backup necessity of dirty data elements constituting each initial dirty sub-group existing in the CM 1147-1 in the management information group 200, from the information to indicate that backup is necessary, to the information to indicate that backup is unnecessary. The initial dirty sub-group of which copying has completed is not erased, but remains in the CM 1147-1.

Figure 8A:
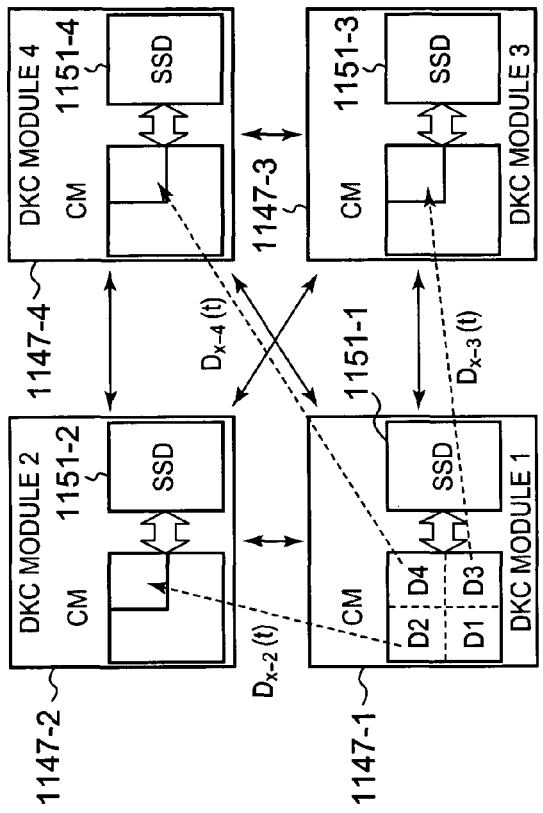
FIG. 8A shows a concept of copying a difference dirty sub-group from DKC module 1 to other DKC modules 2 to 4.

In S1401 in FIG. 14, the second MP 1141B1-1 issues a job to copy the dirty sub-group (hereinafter "difference dirty sub-group") stored in the CM 1147-1 from the forming of the initial dirty sub-groups A1 to A4 or from the previous S1401 to the current time point t to the slave DKC modules 2 to 4, while updating the management information group 200 as a job is executed in each slave DKC module 2 to 4, and updates the difference dirty data elements of which copying has completed in the management information group, so that backup thereof becomes unnecessary (see FIG. 8A).

The second MP 1141B-1 judges whether the consumption ratio of the CM 1147-1 is ¼ or more (S1402). If the consumption ratio of the CM 1147-1 has dropped to less than ¼ (NO in S1402), the second MP 1141B-1 updates the backup necessity corresponding to the dirty data element managed as "backup unnecessary" to information to indicate that backup is necessary in the management information group 200 (S1404). Then the second MP 1141B-1 instructs the other second MPs 1141B-2 to 1141B-4 to clear the job group, and clears the division of the dirty data element group, and releases the management information group 200 (e.g. discards) (S1405). Then the processing returns to S1100 in FIG. 11.

Figure 16:
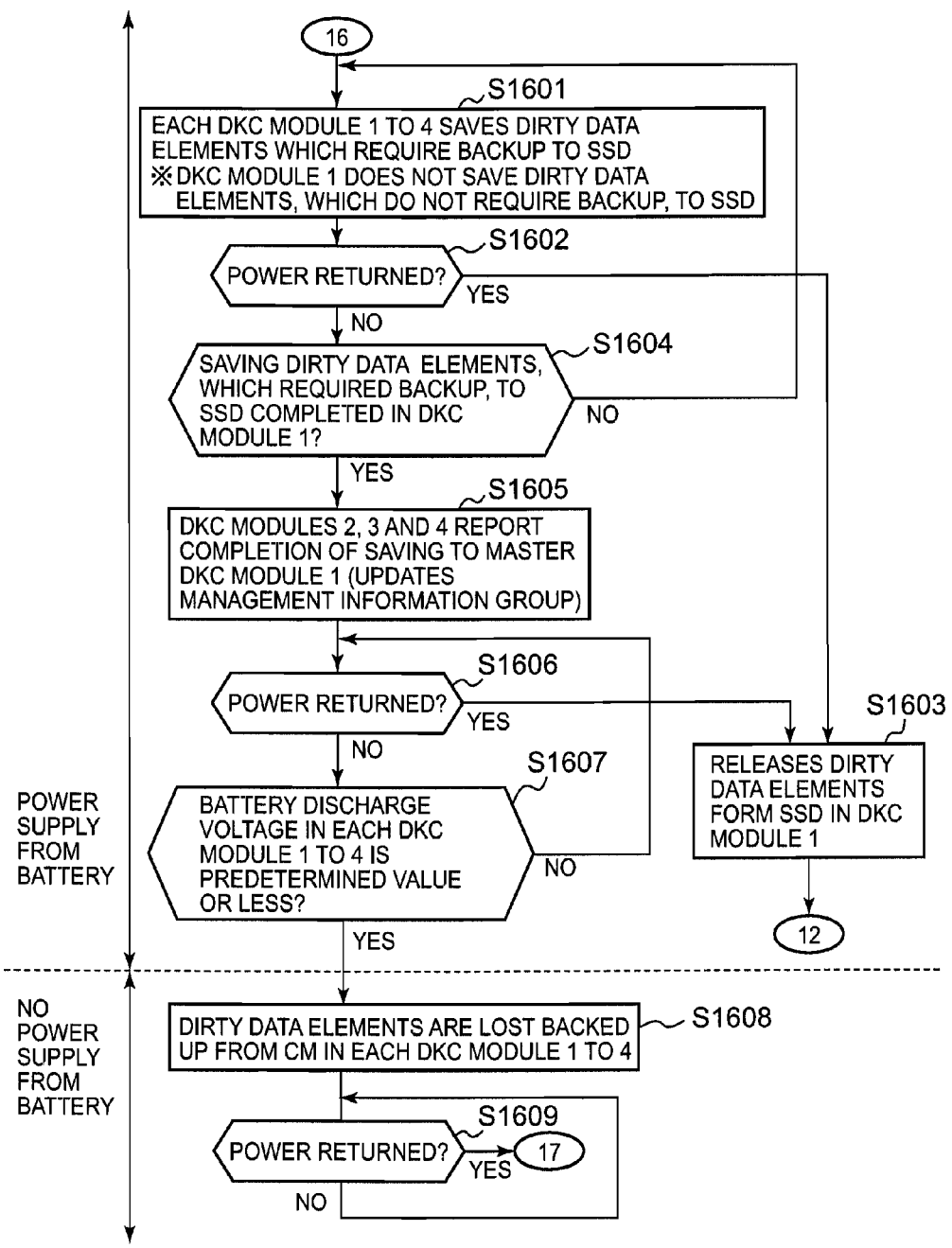
FIG. 16 shows a sixth part of the flow of processing executed in an embodiment of the present invention.

If the consumption ratio of the CM 1147-1 is ¼ or more in S1402, and if a power failure does not occur (NO in S1403), the second MP 1141B-1 returns to S1401, and if a power failure occurred (YES in S1403), the processing advances to S1601 in FIG. 16 (processing after S1601 will be described later). In other words, except in the case of a power failure, copying the difference dirty sub-group is performed when a new dirty data (write data) is written to the CM 1147-1, until the consumption ratio of the CM 1147-1 drops to less than ¼.

As described above, when a power failure does not occur and normal operation is continuing (case A), a plurality of dirty data elements in the CM 1147-1 are evenly distributed to other CMs 1147-2 to 1147-4.

Figure 14:
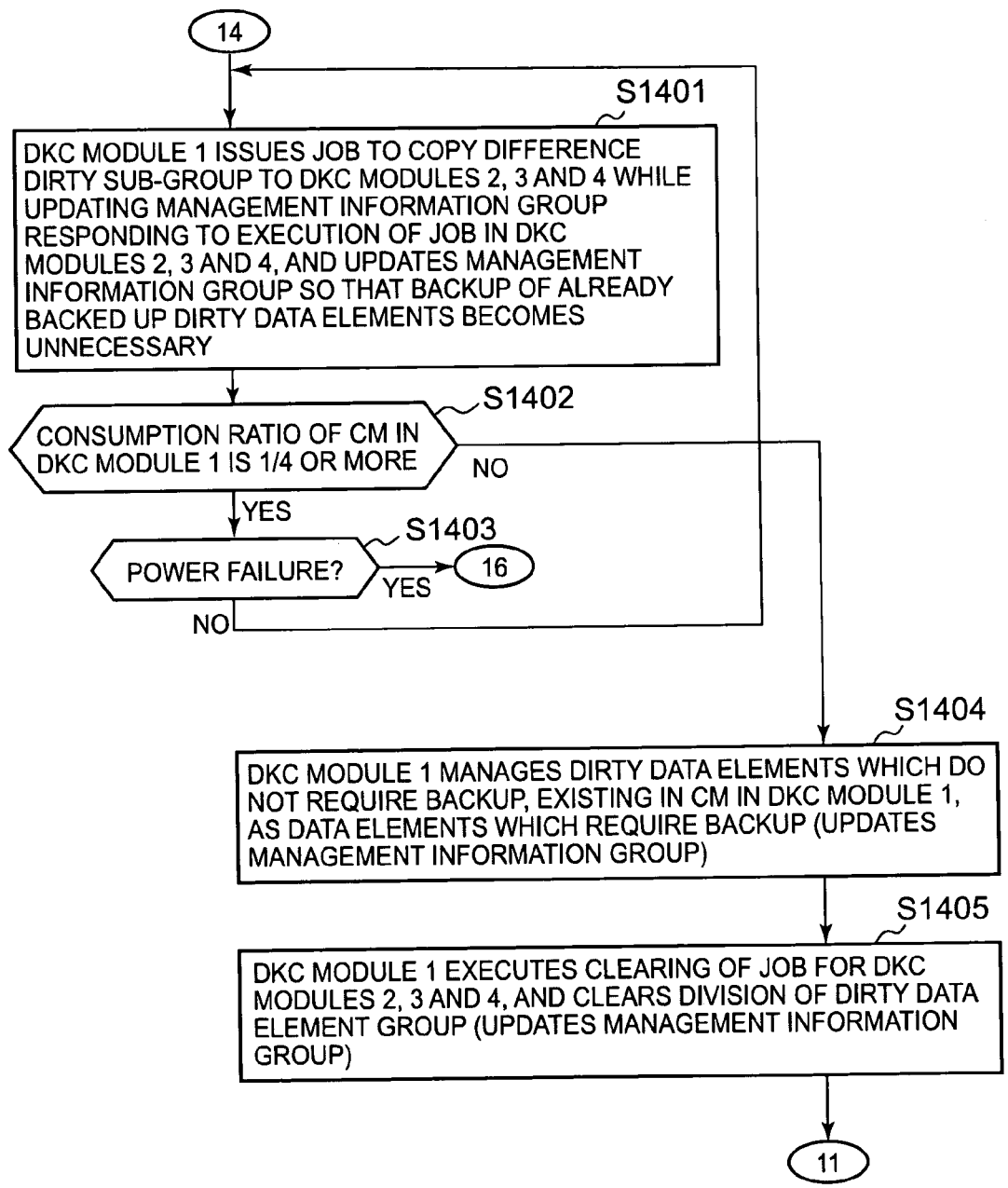
FIG. 14 shows a fourth part of the flow of processing executed in an embodiment of the present invention.

Here it is assumed that a power failure occurred during copying of the initial dirty sub-groups (e.g. when S1203 in FIG. 12 is YES) or during copying of the difference dirty sub-group (e.g. when S1402 in FIG. 14 is YES). Each case will now be described.

<<Power Failure During Copy of Initial Dirty Sub-Group and Recovery from this Power Failure (Power Return)>>

Figure 13:
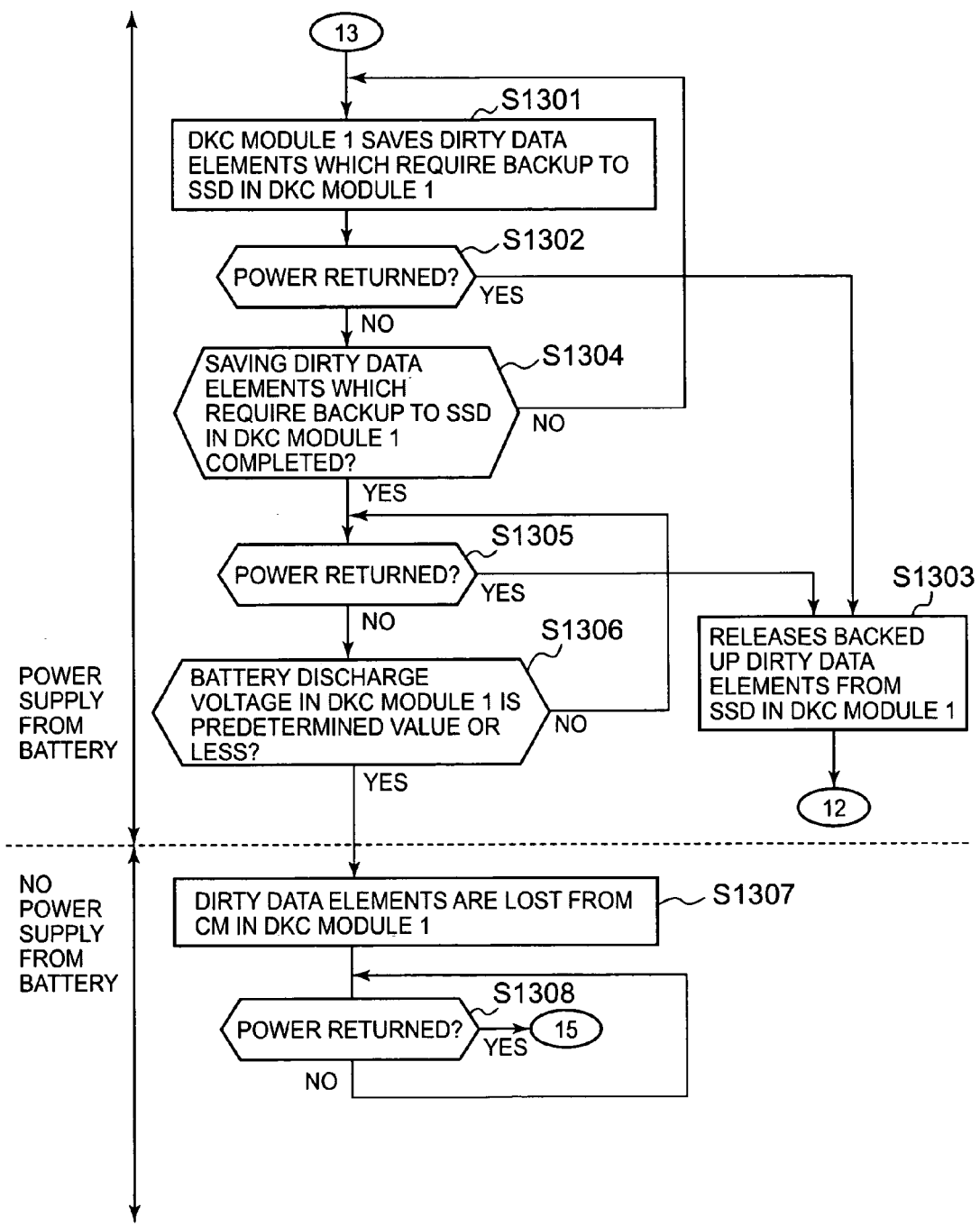
FIG. 13 shows a third part of the flow of processing executed in an embodiment of the present invention.

The occurrence of a power failure when S1203 is YES in FIG. 12 indicates that a failure occurred in the management information group 200 before the backup necessity of the copied dirty data element is updated to "backup unnecessary" (before S1207). Therefore the processing in S1301 and later in FIG. 13 is performed.

In other words, the second MP 1141B-1 refers to the management information group 200, and specifies a cache area where dirty data elements which require backup are stored, and saves the dirty data elements existing in the specified cache area to the SSD 1151-1 (copy) (S1301).

If power is returned here (that is, if the power failure is recovered) (YES in S1302), S1303 is performed, and if power is not returned (NO in S1302), the dirty data elements are continuously saved until saving of the dirty data elements completes (NO in S1304). If the saving of all dirty data elements completed (YES in S1304), the processing advances to S1303 if power returns (YES in S1305), or advances to S1306 if power is not returned (NO in S1305).

In S1306, the second MP 1141B-1 judges whether the discharge voltage (DC voltage) from the battery 118 in the power supply module 115, corresponding to the DKC module 1, is a predetermined value or less. The discharge voltage of predetermined value or less means that the power stored in the battery 118 is exhausted. If power returns before the discharge voltage becomes a predetermined value or less (NO in S1306 and YES in S1305), the second MP 1141B-1 can release the saved dirty data elements from the SSD 1151-1 (S1303), since the saved dirty data elements remain in the CM 1147-1 due to the power supply from the battery 118. In other words, it is unnecessary to return the dirty data elements from the SSD 1151-1 to the CM 1147-1. Releasing the dirty data elements may mean to erase the dirty data elements or to hold information to allow overwriting other data elements on the dirty data elements.

Figure 15:
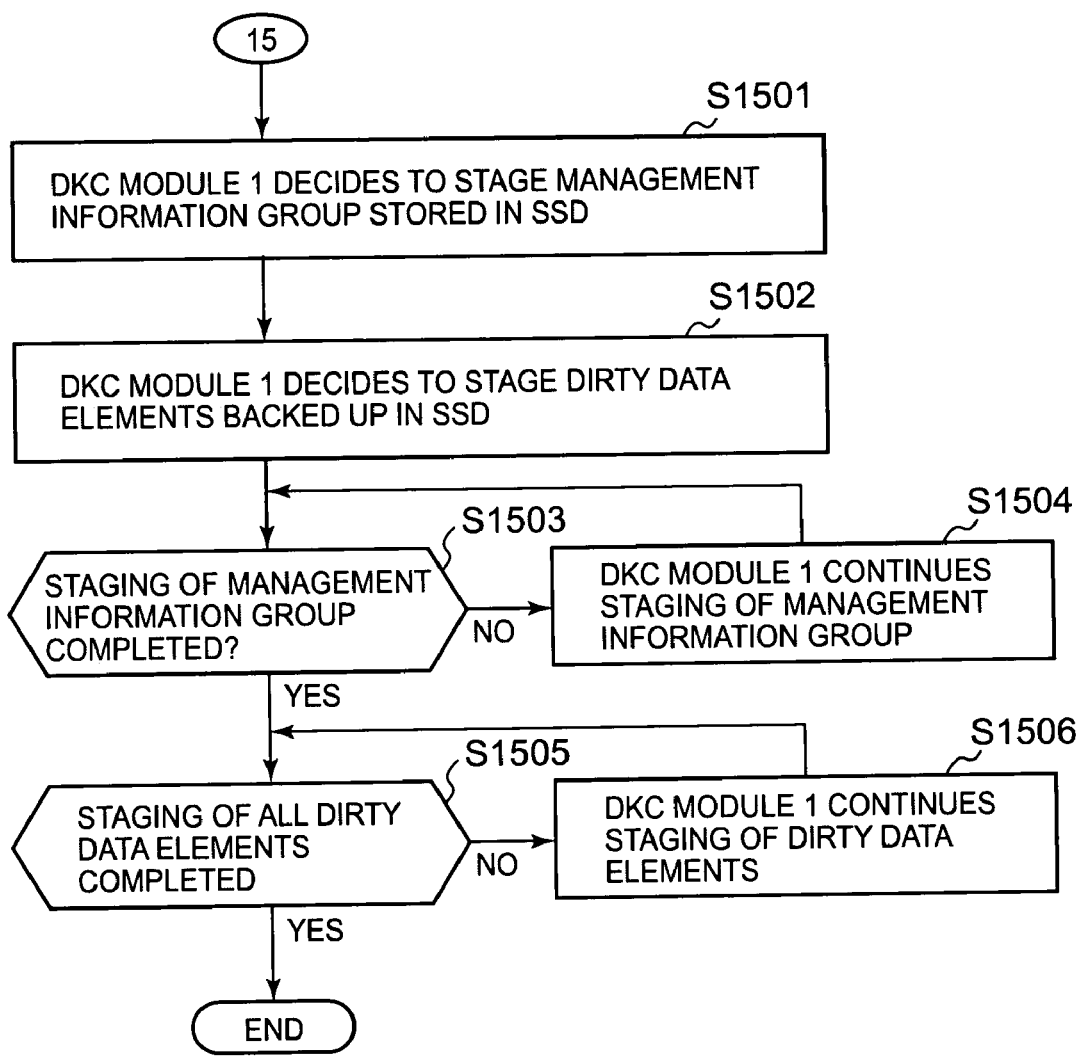
FIG. 15 shows a fifth part of the flow of processing executed in an embodiment of the present invention.

If the discharge voltage becomes the predetermined value or less before power returns (YES in S1306), the power supply to the CM 1147-1 virtually stops, so the dirty data elements are lost from the CM 1147-1 (S1307). If power returns after this (YES in S1308), S1501 in FIG. 15 is performed.

In other words, the second MP 1141B-1 decides to stage the management information group 200 from the SSD 1151-1 to the CM 1147-1 (S1501). The area of the SSD 1151-1, where the management information group 200 exists, can be specified by predetermining the storage destination of the management information group 200 in the SSD 1151-1, for example.

The second MP 1141B-1 also decides to return (restore) the dirty data elements from the SSD 1151-1 to the CM 1147-1 (S1502).

The second MP 1141B-1 reads the data elements constituting the management information group 200 from the SSD 1151-1 until reading the management information group 200 to the CM 1147-1 completes (NO in 1503, and S1504).

When the reading of the management information group 200 to the CM 1147-1 completes (YES in S1503), the second MP 1141B-1 repeats reading of the dirty data elements from the SSD 1151-1 and writing the dirty data elements to the CM 1147-1 until staging all the saved dirty data elements to the CM 1147-1 completes (NO in S1505, and S1506). When the staging of all the dirty data elements completes (YES in S1505), the processing ends. The configuration example of the dirty data elements stored in the SSD 1151-1 is shown in FIG. 6B. In other words, the second MP 1141B-1, which performs the saving, adds a header field 1501 to a data field 1503 where the dirty data elements are stored, and an ID of the transmission source DKC module is recorded in the header field 1501, and an address of the saving source cache area is recorded in the data field 1503. By this, the dirty data elements read from the SSD 1151-1 are staged in the saving source cache area, which is specified by the dirty data elements.

<<Power Failure During Copying of Difference Dirty Sub-Group and Recovery from this Power Failure (Power Return)>>

A power failure occurrence when S1402 is YES in FIG. 14 indicates that a failure occurred in the management information group 200 after backup necessity of the copied dirty data element is updated to "backup unnecessary" (after S1207). Therefore the processing in S1601 or later in FIG. 16 is performed.

In other words, the respective second MP 1141B-1 to 1141B-4 refers to the management information group 200 or the cache management information in each DKC module 1 to 4, and specifies a cache area where the dirty data elements which require backup are stored, and saves the dirty data elements, existing in the specified cache area, to the SSD 1151-1 to 1151-4 respectively (copy) (S1601).

If power returns here (that is, if the power failure is recovered) (YES in 1602), S1603 is performed, and if power does not return (NO in S1602), the dirty data elements are continuously saved until the saving of the dirty data elements completes in each DKC module 1 to 4 (NO in S1604). If the saving of all the dirty data elements is completed (YES in S1604), the second MP 1141B-2 to 1141B-4 in the slave DKC modules 2 to 4 reports the completion of saving all the dirty data elements to the second MP 1141B-1 in the master DKC module 1. Responding to the completion report, the second MP 1141B-1 updates the second management information 200 (e.g. updates the saving completion flag corresponding to each copied dirty data element from information to indicate incomplete to information to indicate complete). If power returns after this (YES in S1606), the processing advances to S1603, and if power does not return (NO in S1606), the processing advances to S1607.

In S1607, in the DKC modules 1 to 4, the second MP 1141B-1 to 1141B-4 judge whether the discharge voltage (DC voltage), from the battery 118 in the power supply module 115 corresponding to each DKC module 1 to 4, is a predetermined value or less. If power returns before the discharge voltage becomes a predetermined value or less (NO in S1607 and YES in S1606), the saved dirty data elements remain in the CM 1147-1 to 1147-4 because of power supply from the battery 118, so the second MP 1141B-1 to 1141B-4 may release the saved dirty data elements from the SSD 1151-1 to 1151-4 (S1603). In other words, it is unnecessary to return the dirty data elements from the SSD 1151-1 to 1151-4 to the CM 1147-1 to 1147-4.

Figure 17:
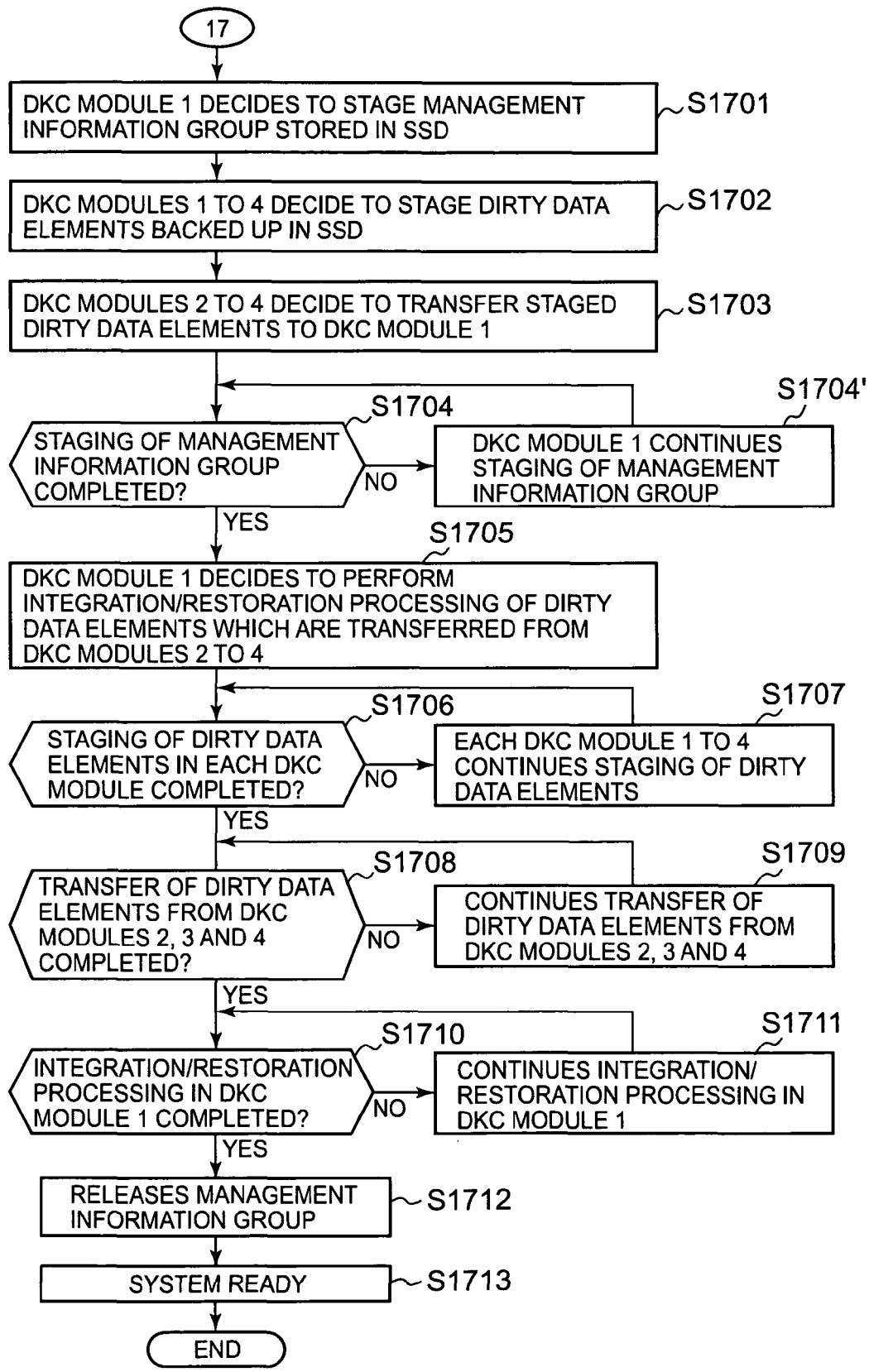
FIG. 17 shows a seventh part of the flow of processing executed in an embodiment of the present invention.
Figure 18:
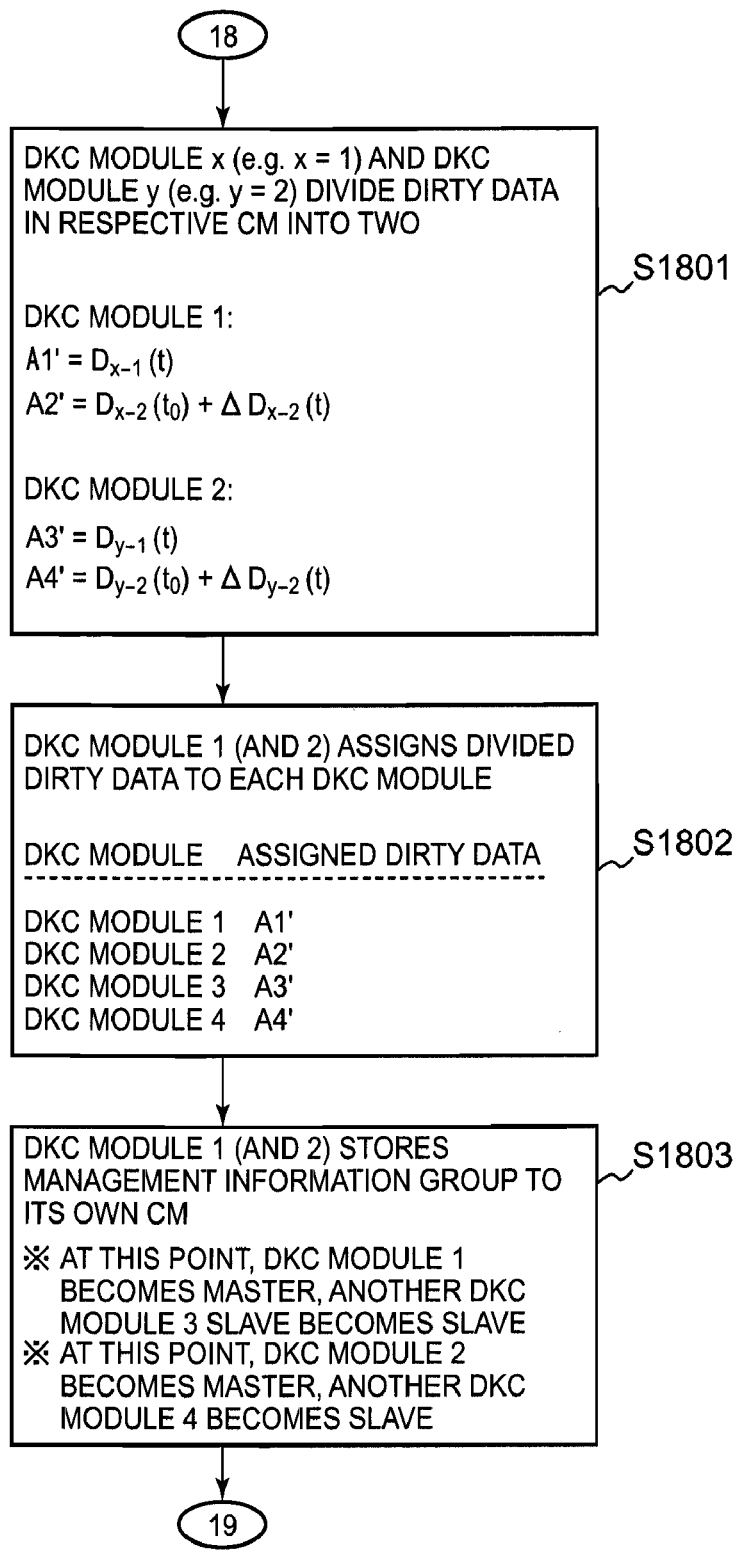
FIG. 18 shows an eighth part of the flow of processing executed in an embodiment of the present invention.

If the discharge voltage becomes the predetermined value or less before power returns (YES in S1607), the power supply to the CM 1147-1 to 1147-4 virtually stops, so the dirty data elements are lost from the CM 1147-1 to 1147-4 (S1608). If power returns after this (YES in S1609), S1701 in FIG. 17 is performed.

In other words, the second MP 1141B-1 decides to stage the management information group 200 from the SSD 1151-1 to the CM 1147-1 (S1701).

The second MP 1141B-1 to 1141B-4 also decide to return (restore) the dirty data elements from the SSD 1151-1 to 1151-4 to the CM 1147-1 to 1147-4 (S1702).

Also the second MP 1141B-2 to 1141B-4 decide to transfer the staged dirty data elements from the CM 1147-2 to 1147-4 to the CM 1147-1 (S1703).

If the data elements constituting the management information group 200 are staged from the SSD 1151-1 to the CM 1147-1 until the staging of the management information group 200 to the CM 1147-1 completes (NO in S1704, and S1704'), and this staging is completed (YES In S1704), the second MP 1141B-1 decides to perform integration and restoration processing for the dirty data elements transferred from the slave DKC modules 2 to 4 (S1705).

Figure 8B:
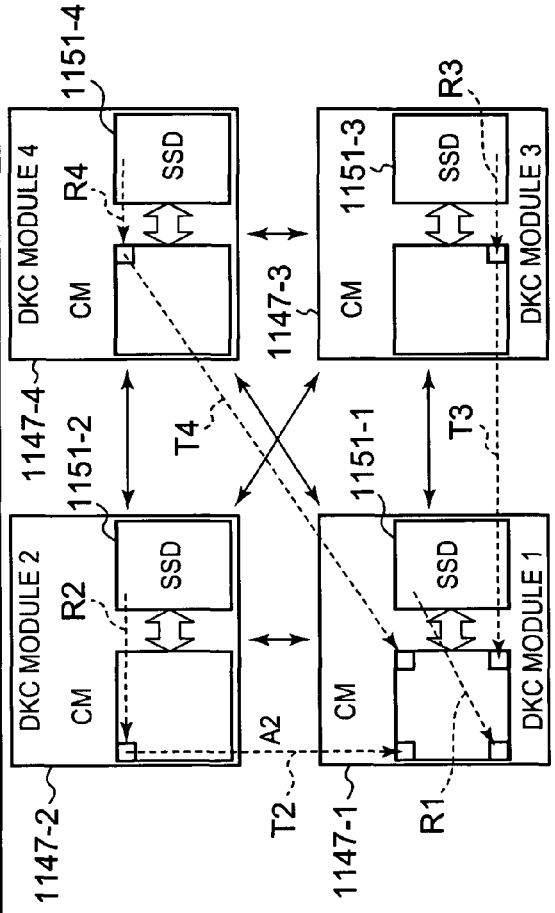
FIG. 8B shows a concept of staging a dirty data element in DKC modules 1 to 4, and transferring a dirty data element from other DKC modules 2 to 4 to DKC module 1.

Until the staging of all the saved dirty data elements to the CM 1147-1 to 1147-4 completes, the second MP 1141B-1 to 1141B-4 repeats reading of dirty data elements from the SSD 1151-1 to 1151-4, and writing these dirty data elements to the CM 1147-1 to 1147-4 (NO in S1706 and S1707). When the staging of all the dirty data elements completes (YES in S1706), S1708 is performed. In S1707, the dirty data elements, read from the SSD 1151-1 to 1151-4, are staged in the saving source cache areas specified by the dirty data elements respectively (dotted lines R1 to R4 in FIG. 8B).

Until all the staged dirty data elements are transferred from the CM 1147-2 to 1147-4 to the DKC module 1 (DKC module specified by the header of the staged dirty data element) (doted line T1 to T4 in FIG. 8B), the second MPs 1141B-2 to 1141B-4 repeat transfer of the dirty data elements from the CM 1147-2 to 1147-4 (NO in S1708, and S1709). When the transfer of all the dirty data elements completes (YES in S1708), S1710 is executed. Each dirty data element staged in the CM 1147-2 to 1147-4 specifies that the copy source DKC module is the DKC module 1, so the plurality of dirty data elements staged in the CM 1147-2 to 1147-4 are collected in the CM 1147-1 in the DKC module 1. In S1709, a dirty data element in the CM 1147-2 to 1147-4 is written in the cache area in the CM 1147-1 corresponding to the cache area where the dirty data element is stored (dotted line T2 to T4 in FIG. 8B). For example, the dirty data element staged in the cache area #1 in the CM 1147-2 is written to the cache area #1 in the CM 1147-1.

Until the integration and restoration processing of all the dirty data elements, which were transferred and written to the CM 1147-1, completes, the second MP 1141B-1 repeats the integration and restoration processing of the dirty data elements (NO in S1710, and S1711). In the integration and restoration processing of the dirty data elements, the following are performed, for example.

The DKC module 1 refers to the copy source information and copy destination information of each cache area (e.g. segment) in the first management information 201A of the management information group (see FIG. 6A). (The management information group has been staged in the CM of the DKC module 1 in S1704 in FIG. 17).

The DKC module 1 issues a job to copy the data elements in the copy destination cache area, to the CM of the original DKC module 1, to each DKC module 2, 3 and 4 based on the above mentioned copy destination information/copy source information (the destination to which a copied data element is returned (cache address) need not be the same as the original cache address).

The above mentioned job management information is stored in the second management information 201B of the management information group in the DKC module 1 (see FIG. 6A), and the management information group is updated each time copy processing for each cache area completes.

When the integration and restoration processing of the dirty data elements completes (YES in S1710), the second MP 1141B-1 releases the management information group 200 (S1712). In other words, when all the copying jobs from each DKC module 2, 3 and 4 completes (when the integration and restoration processing of the dirty data elements complete), all the information in the management information group related to the dirty data division is released (e.g. deleted).

Then the storage system 100 becomes ready status (status where the receiving of I/O commands can be started) (S1713). Ready status occurs when all the following conditions are satisfied.

Staging processing of the dirty data elements from the SSD to the CM has been completed.

Configuration information (information on the configuration of the storage system 100, such as information on a RAID where an LDEV exists) is read from the memory in the CM-PK, and is staged in the CM.

Power ON processing (processing executed when power is turned ON, such as boot processing) of the MP in the MP-PK has been completed.

Disk device has been started and is in a status to receive I/O commands (in other words, the disk device is in ready status).

A predetermined diagnosis was performed between composing elements (e.g. diagnosis program was executed), and completed without detecting error(s).

If it is judged that the consumption ratio is the second predetermined ratio or more in at least one DKC module 2, 3 or 4 in S1101 in FIG. 11, (NO in S1101), the second MP 1141B-1 judges whether there are two DKC modules of which the consumption ratio is the first predetermined ratio or more, including the DKC module 1 (S1102). If the judgment result is "not 2" (the judgment result is "3" or "4") (NO in S1102), then the number of DKC modules to be a copy designation of a dirty data element is 1 or 0 (e.g. if the number of DKC modules is 1, there will be too many dirty data elements in the CM 1147 of the copy destination DKC module 113, and a later mentioned effect of a decrease in the system down time cannot be expected) so the processing returns to S1100. If the judgment result is "2" (YES in S1102), then the second MP 1141B-1 judges whether the consumption ratios of the CM 1147 of the rest of the DKC modules 113 are all less than the second predetermined ratio (S1103). If it is judged that the consumption ratio of at least one CM 1147 is the second predetermined ratio or more (NO in S1103), the processing returns to S1100, and if it is judged that all the consumption ratios of all the CMs 1147 are less than the second predetermined ratio (YES in S1103), then the processing advances to S1801 in FIG. 18. The processing after S1801 is the processing which is executed in the case of (case B).

In S1801, the second MP 1141B-x (and 1141B-y) evenly divides the dirty data element group in the CM 1147-x (and 1147-y) into two. In the following description, it is assumed that x=1 and y=2, just like the example in FIG. 4A. The dirty data element group in the CM 1147-1 is divided in the following first and second initial dirty sub-groups (initial dirty sub-groups A1' and A2'), and the dirty data element group in the CM 1147-2 is divided into the following third and fourth initial dirty sub-groups (initial dirty sub-groups A3' and A4').

A1': $D_{x-1}(t)$
A2': $D_{x-2}(t_0)+\Delta D_{x-2}(t)$
A3': $D_{y-1}(t)$
A4': $D_{y-2}(t_0)+\Delta D_{y-2}(t)$ As mentioned later, the first master-slave relationship where the DKC module 1 is a master and an arbitrary DKC module x' (x'=3) is a slave, and the second master-slave relationship where the DKC module 2 is a master and an arbitrary DKC module y' (y'=4) is a slave are established, but the processing in the first master-slave relationship will be mainly described, and the processing in the second master-slave relationship will be described as supplements in parenthesis.

Then in S1802, the second MP 1141B-1 assigns the initial dirty sub-groups A1' and A2' to the DKC modules 1 and 3 respectively (the second MP 1141B-2 assigns the initial dirty sub-groups A3' and A4' to the DKC modules 2 and 4 respectively). The result of the assignment is as shown in the drawing. To prevent confusion, the management information group generated by the DKC module 1 is called the "management information group 200-1", and the management information group generated by the DKC module 2 is called the "management information group 200-2".

Figure 9A:
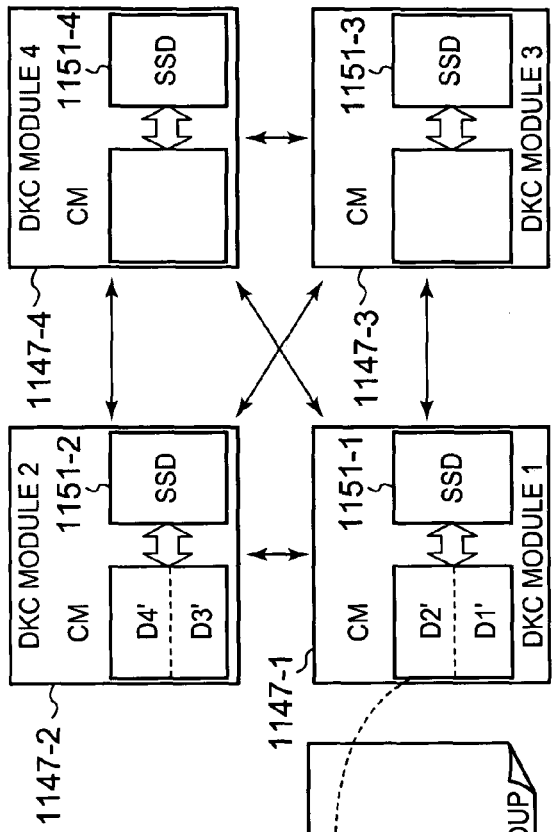
FIG. 9A shows an example of dividing a dirty data element group in DKC modules 1 and 2.

In S1803, the second MP 1141B-1 (and 1141B-2) stores the management information group 200-1 (and 200-2) to the CM 1147-1 (and 1147-2). As a result, as FIG. 9A shows, two initial dirty sub-groups and the management information group 200-1 (and 200-2) are stored in the CM 1147-1 (and 1147-2). At this point in S1803, a first master-slave relationship, where a DKC module 1 is a master and the DKC module 3 is a slave, and a second master-slave relationship where the DKC module 2 is a master and the DKC module 4 is a slave, are established. For example, the second MP 1141B-1 notifies the second MP 1141B-2 that the DKC module 2 is a master and the DKC module 4 is the slave thereof, so that the second MP 1141B-1 recognizes the DKC module 2 as a master, and the DKC module 4 as a slave thereof.

Figure 9B:
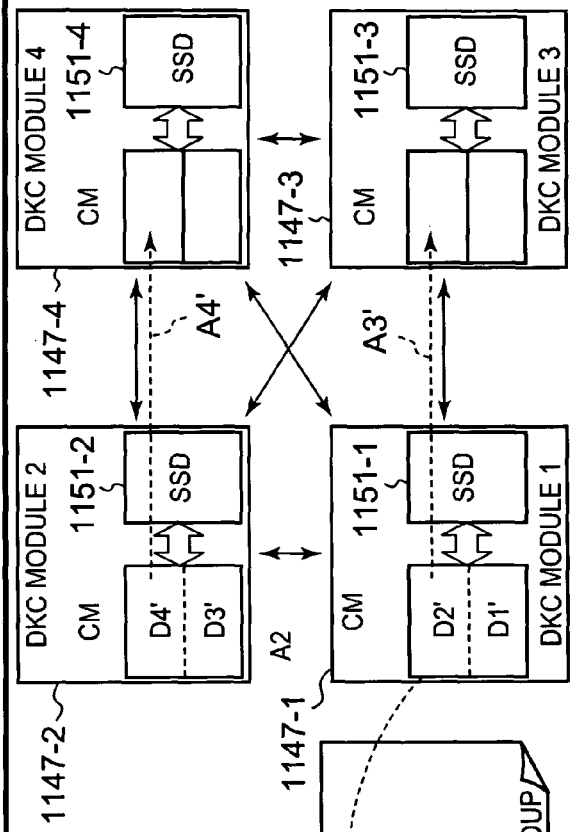
FIG. 9B shows a concept of copying an initial dirty sub-group from DKC module 1 (and 2) to another DKC module 3 (and 4)
Figure 19:
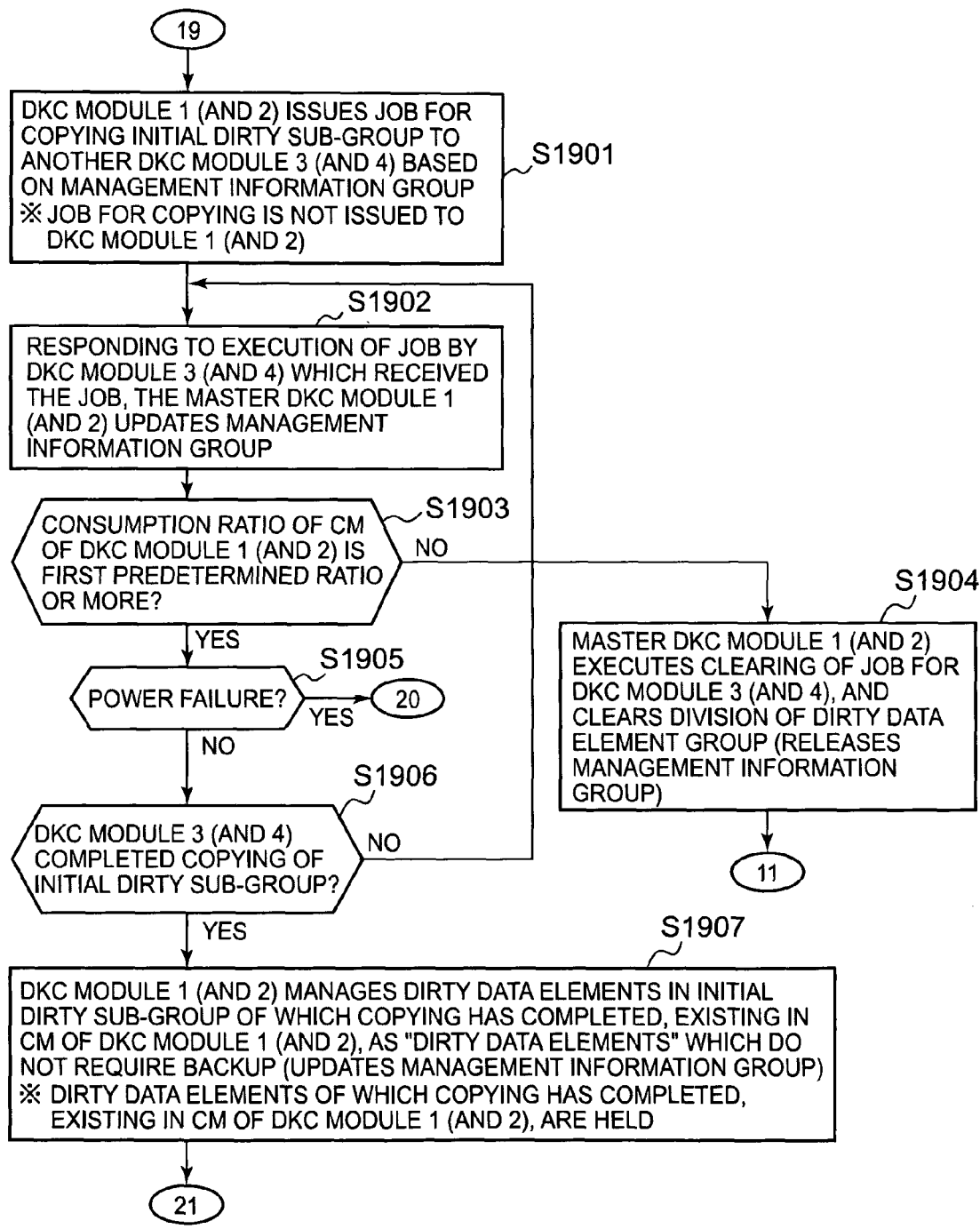
FIG. 19 shows a ninth part of the flow of processing executed in an embodiment of the present invention.

In S1901 in FIG. 19, the second MP 1141B-1 (and 1141B-2) issues a job group to copy the assigned initial dirty sub-groups A2' (and A4') to the second MP 1141B-3 (and 1141B-4) of the slave DKC module 3 (and 4) based on the management information group 200-1 (and 200-2) (see FIG. 9B).

The second MP 1141B-1 (and 1141B-2) updates the management information group 200-1 (and 200-2) as the slave DKC module 3 (and 4) executes the job (S1902).

The second MP 1141B-1 (and 1141B-2) judges whether the dirty data elements are stored in the CM 1147-1 (and 1147-2) exceeding the first predetermined ratio based on the cache management information and management information group 200-1 (and 200-2) after update (S1903).

If the judgment result is "not stored" in S1903 (NO in S1903), the second MP 1141B-1 (and 1141B-2) instructs another second MP 1141B-3 (and 1141B-4) to clear the job group, clears the division of the dirty data element group, and releases the management information group 200-1 (and 200-2) (S1904). Then the processing returns to S1100 in FIG. 11.

If the judgment result is "stored" in S1903 (YES in S1903), and if a power failure does not occur (NO in S1905), then the second MP 1141B-1 (and 1141B-2) judges whether copying of the initial dirty sub-group A2' (and A4') has completed in the slave DKC module 3 (and 4) (S1906). If it is judged that the copying of the initial dirty sub-group A2' (and 4') has not been completed in the DKC module 3 (and 4) (NO in S1906), the processing returns to S1902, and if it is judged that the copy of the initial dirty sub-group A2' (and A4') has been completed in the DKC module 3 (and 4) (YES In S1906), then the processing advances to S1907. If a power failure occurs after YES in S1903 (YES in S1905), the processing advances to S2001 in FIG. 20 (processing after S2001 will be described later).

In S1907, the second MP 1141B-1 (and 1141B-2) updates the backup necessity of the dirty data elements constituting each initial dirty sub-group A2' (and A4') existing in the CM 1147-1 (and 1147-2) in the management information group 200-1 (and 200-2) from the information to indicate that backup is necessary to the information to indicate that backup is unnecessary. The initial dirty sub-group A2' (and A4') of which copying has completed is not erased, but remains in the CM 1147-1 (and 1147-2).

Figure 21:
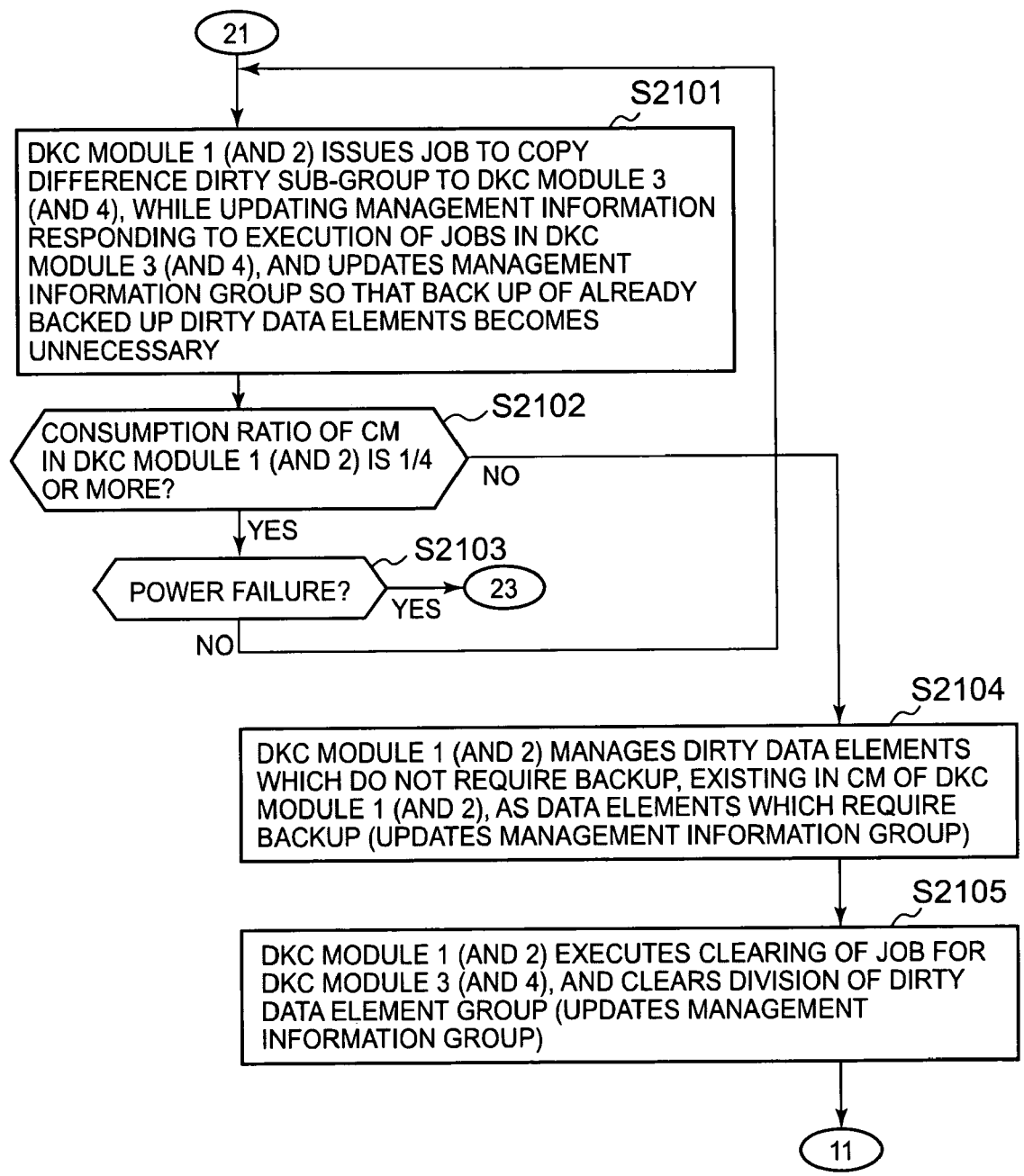
FIG. 21 shows an eleventh part of the flow of processing executed in an embodiment of the present invention.

Then in S2101 in FIG. 21, the second MP 1141B-1 (and 1141B-2) issues the job to copy the difference dirty sub-group stored in the CM 1147-1 (and 1147-2) since forming the initial dirty sub-group A2' (and A4') or since the previous S2101, to the current time point t, to the slave DKC module 3 (and 4), while updating the management information group 200-1 (and 200-2) when a job is executed in each slave DKC module 3 (and 4), and updates the management information group that the difference dirty data element of which copy has completed becomes "backup unnecessary" (see FIG. 10A).

The second MP 1141B-1 (and 1141B-2) judges whether the consumption ratio of the CM 1147-1 is ¼ or more (S2102). If the consumption ratio of the CM 1147-1 (and 1147-2) has dropped to less than ¼ (NO in S2102), the second MP 1141B-1 (and 1141B-2) updates the backup necessity corresponding to the dirty data element managed in the management information group 200-1 (and 200-2) as "backup unnecessary" to information to indicate that backup is necessary (S2104). Then the second MP 1141B-1 (and 1141B-2) instructs the second MP 1141B-3 (and 1141B-4) to clear the job group, and clears the division of the dirty data element group, and releases the management information group 200-1 (and 200-2) (s2105). Then the processing returns to S1100 in FIG. 11.

Figure 23:
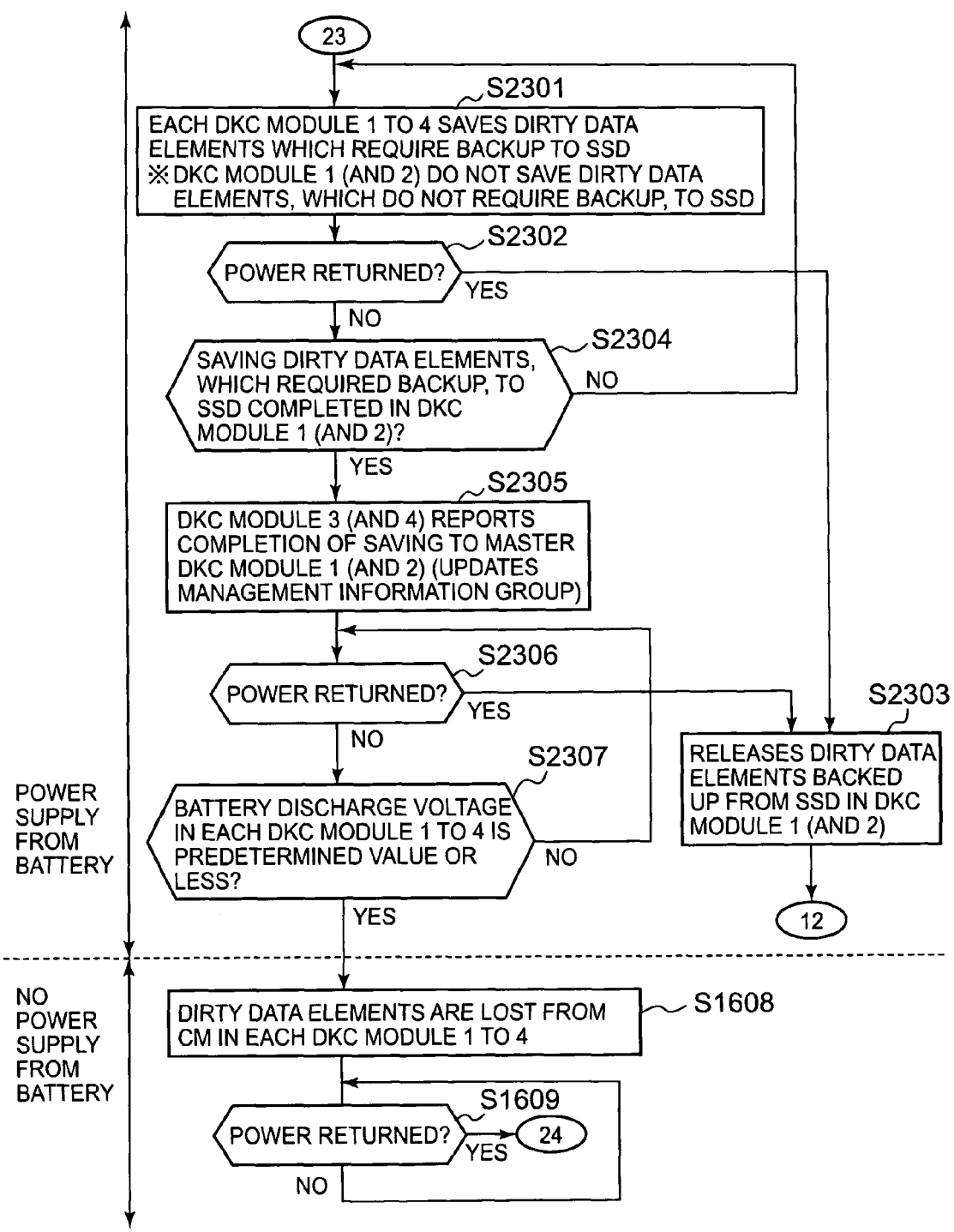
FIG. 23 shows a thirteenth part of the flow of processing executed in an embodiment of the present invention.

If the consumption ratio of the CM 1147-1 is ¼ or more in S2102, and if a power failure does not occur (NO in S2103), the second MP 1141B-1 (and 1141B-2) returns to S2101, and if a power failure occurs (YES in S2103), the processing advances to S2301 in FIG. 23 (processing after S2301 will be described later).

As described above, when a power failure does not occur and normal operation continues, a plurality of dirty data elements in the CM 1147-1 (and 1147-2) are evenly distributed to another CM 1147-3 (and 1147-4) in (case B).

Now it is assumed that a power failure occurred during copying the initial dirty sub-group (e.g. YES in S1905 in FIG. 19) or a power failure occurred during copying the difference duty sub-group (e.g. YES in S2102 in FIG. 21). These cases will be described respectively.

<<Power Failure During Copying of Initial Dirty Sub-Group, and Recovery from the Power Failure (Power Return)>>

Figure 20:
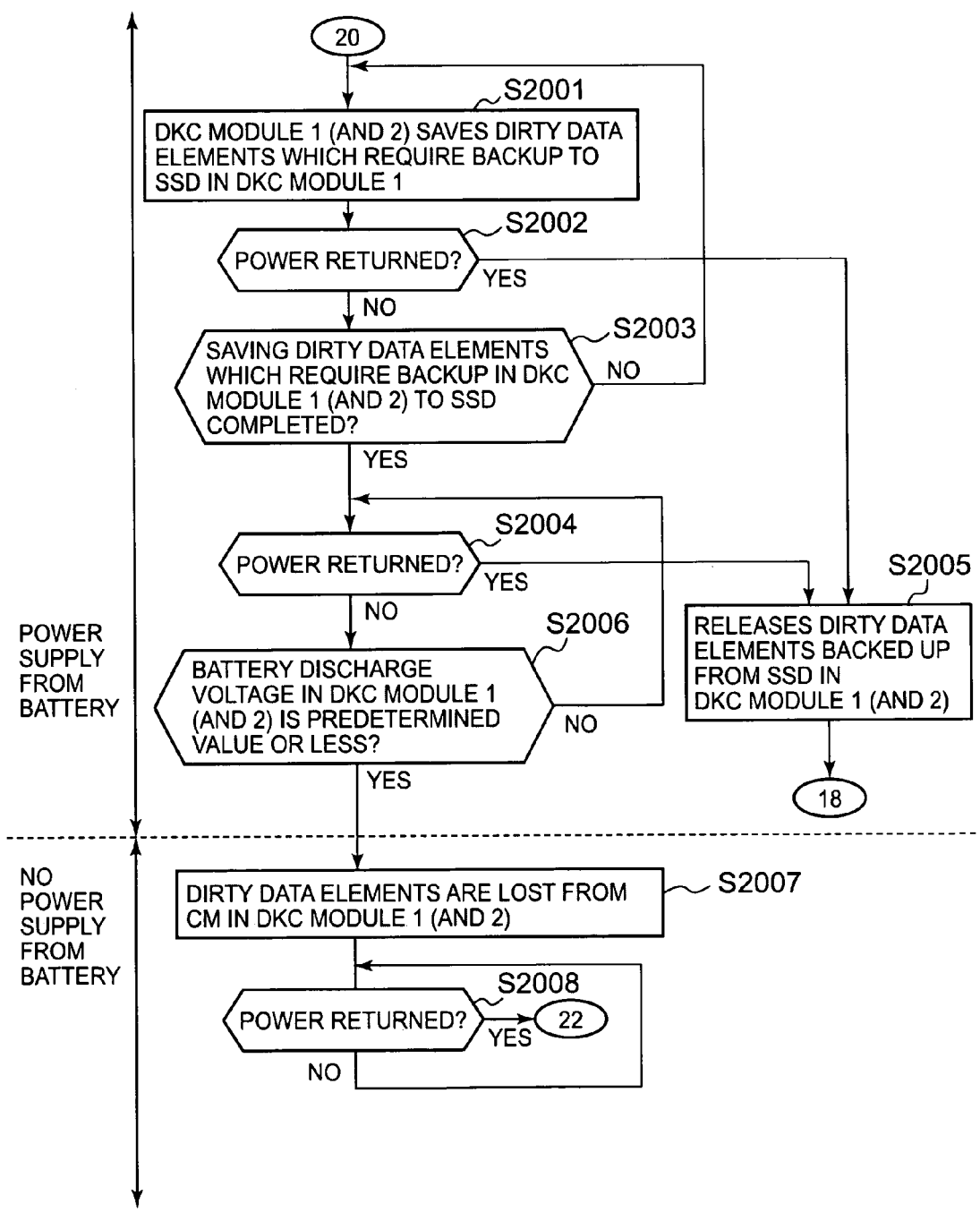
FIG. 20 shows a tenth part of the flow of processing executed in an embodiment of the present invention.

The occurrence of a power failure when S1905 is YES in FIG. 19 means that a failure occurred before the backup necessity of the copied dirty data element is updated to "backup unnecessary" (before S1907) in the management information group 200-1 (and 200-2). Therefore processing in S2001 and later in FIG. 20 is performed.

In other words, the second MP 1141B-1 (and 1141B-2) refers to the management information group 200-1 (and 200-2), and specifies a cache area where dirty data elements which require backup are stored, and saves the dirty data elements existing in the specified cache area to the SSD 1151-1 (and 1151-2) (S2001).

If power is returned here (YES in S2002), S2005 is performed, and if power is not returned (NO in S2002), the dirty data elements are continuously saved until the saving of the dirty data elements completes (NO in S2004). If saving of all the dirty data elements is completed (YES in S2004), the processing advances to S2005 if power returns (YES in S2004), or advances to S2006 if power is not returned (NO in S2004).

In S2006, the second MP 1141B-1 (and 1141B-2) judges whether the discharge voltage (DC voltage) from the battery 118 in the power supply module 115 corresponding to the master DKC module 1 (and 2) is a predetermined value or less. If power recovers before the discharge voltage becomes a predetermined value or less (NO in S2006 and YES in S2004), the second MP 1141B-1 (and 1141B-2) can release the saved dirty data elements from the SSD 1151-1 (and 1151-2) since the saved dirty data elements remain in the CM 1147-1 (and 1147-2) because of the power supply from the battery 118 (S2005).

Figure 22:
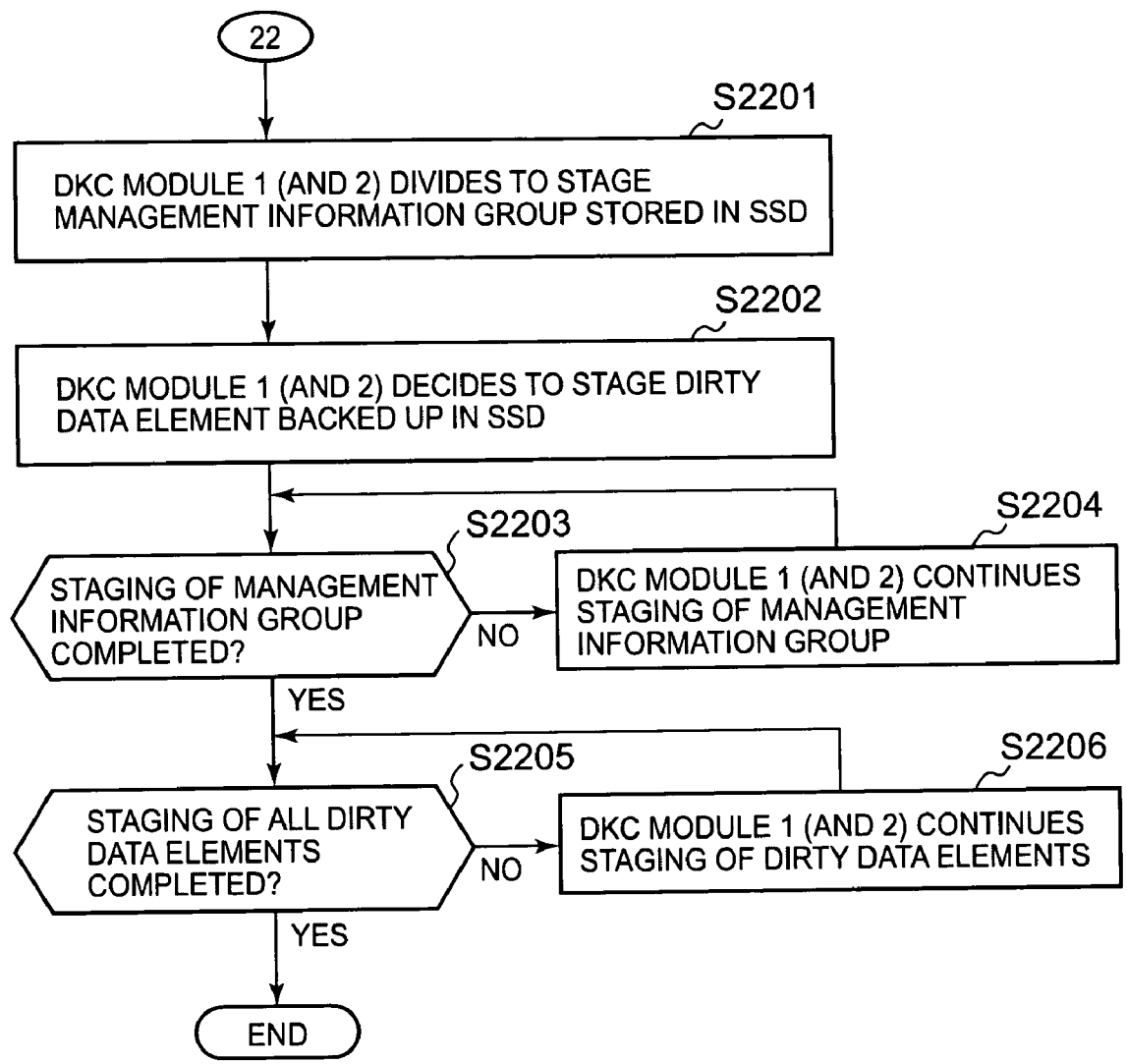
FIG. 22 shows a twelfth part of the flow of processing executed in an embodiment of the present invention.

If the discharge voltage becomes the predetermined value or less before power returns (YES in S2006), power supply to the CM 1147-1 (and 1147-2) virtually stops, so the dirty data elements are lost from the CM 1147-1 (and 1147-2) (S2007). If power returns after this (YES in S2008), S2201 in FIG. 22 is performed.

In other words, the second MP 1141B-1 (and 1141B-2) decides to stage the management information group 200-1 (and 200-2) from the SSD 1151-1 (and 1151-2) to the CM 1147-1 (and 1147-2) (S2201).

The second MP 1141B-1 (and 1141B-2) also decides to stage the dirty data elements from the SSD 1151-1 (and 1151-2) to the CM 1147-1 (and 1147-2) (S2202).

The second MP 1141B-1 (and 1141B-2) reads the data elements constituting the management information group 200-1 (and 200-2) from the SSD 1151-1 (and 1151-2) until reading the management information group 200-1 (and 200-2) to the CM 1147-1 (and 1147-2) completes (NO in S2203, and S2204).

When the reading of the management information group 200-1 (and 200-2) to the CM 1147-1 (and 1147-2) completes (YES in S2203), the second MP 1141B-1 (and 1141B-2) repeats reading of the dirty data elements from the SSD 1151-1 (and 1151-2) and writing the dirty data elements to the CM 1147-1 (and 1147-2) until staging of all the saved dirty data elements to the CM 1147-1 (and 1147-2) completes (NO in S2205, and S2206). When staging of all the dirty data elements completes (YES in S2205), the processing ends.

<<Power Failure During Copying of Difference Dirty Sub-Group and Recovery from this Power Failure (Power Return)>>

The occurrence of a power failure when S2102 is YES in FIG. 21 means that a failure occurred after the backup necessity of the copied dirty data element is updated to "backup unnecessary" (after S1907) in the management information group 200-1 (and 200-2). Therefore processing in S2301 or later in FIG. 23 is performed.

In other words, the respective second MP 1141B-1 to 1141B-4 refers to the management information 200-1 (and 200-2) or cache management information) in each DKC module 1 to 4, and specifies a cache area where the dirty data elements which require backup are stored, and saves the dirty data elements existing in the specified cache area to the SSD 1151-1 to 1151-4 respectively (S2301).

If power returns here (YES in S2302), S2303 is performed, and if power does not return (NO in S2302), the dirty data elements are continuously saved until saving of the dirty data elements completes in each DKC module 1 to 4 (NO in S2304). If saving of all the dirty data elements is completed (YES in S2304), the second MP 1141B-3 (and 1141B-4) in the slave DKC module 3 (and 4) reports the completion of saving all the dirty data elements to the second MP 1141B-1 (and 1141B-2) in the master DKC module 1 (and 2). Responding to the completion report, the second MP 1141B-1 (and 1141B-2) updates the second management information 200-1 (and 200-2) (e.g. updates the saving completion flag corresponding to each copied dirty data element from information to indicate incomplete to information to indicate complete). If power returns after this (YES in S2306) the processing advances to S2303, and if power does not return (NO in S2306), the processing advances to S2307.

In S2307, in the DKC modules 1 to 4, the second MP 1141B-1 to 1141B-4 judges whether the discharge voltage (DC voltage) from the battery 118 in the power supply module 115 corresponding to each DKC module 1 to 4 is a predetermined value or less. If power returns before the discharge voltage becomes a predetermined value or less (NO in S2307 and YES in S2306), the saved dirty data elements remain in the CM 1147-1 to 1147-4 because of the power supply from the battery 118, so the second MP 1141B-1 to 1141B-4 may release the saved dirty data elements from the SSD 1151-1 to 1151-4 (S2303).

Figure 24:
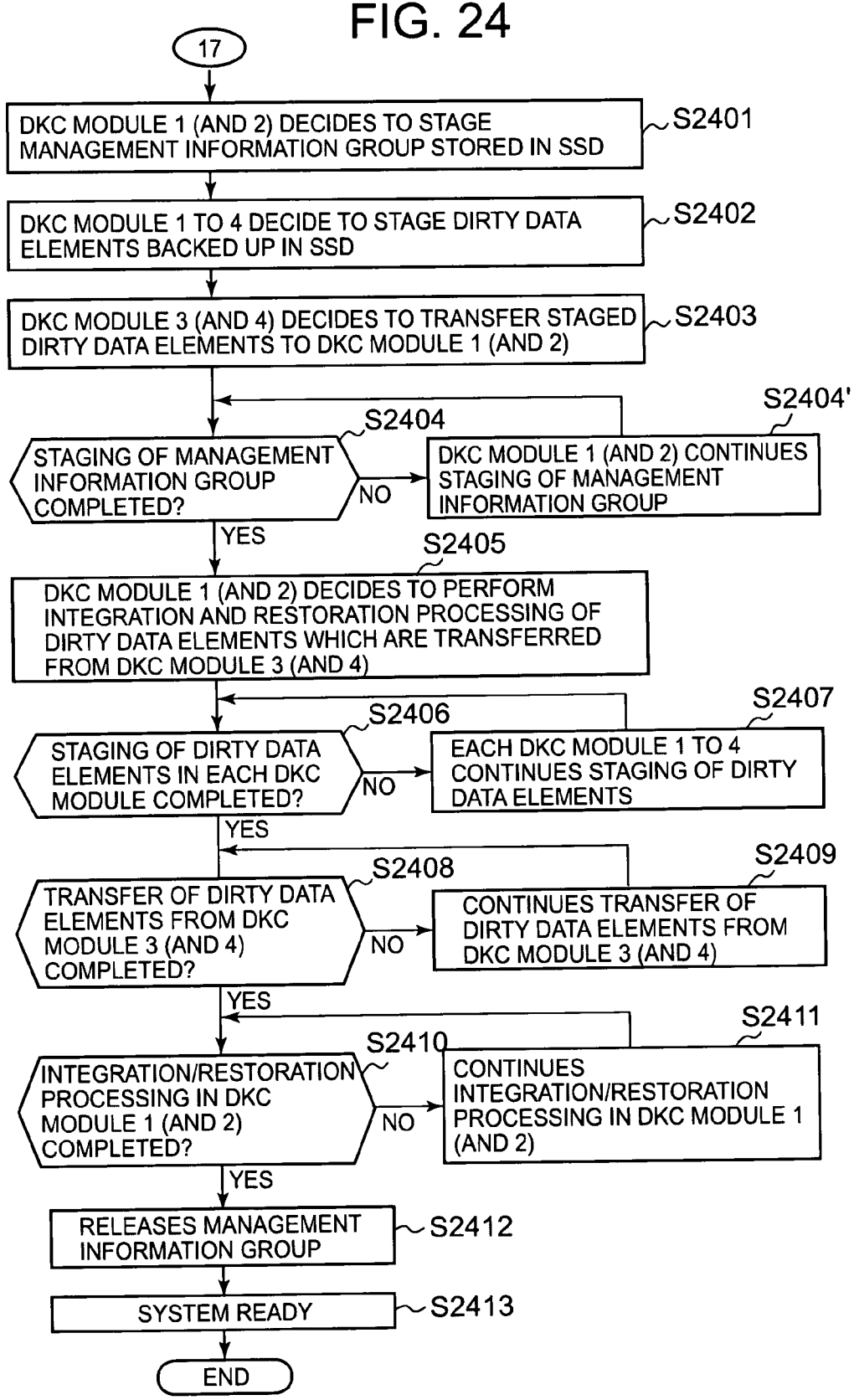
FIG. 24 shows a fourteenth part of the flow of processing executed in an embodiment of the present invention.

If the discharge voltage becomes the predetermined value or less before power returns (YES in S2307), the power supply to the CM 1147-1 to 1147-4 virtually stops, so the dirty data elements are lost from the CM 1147-1 to 1147-4 (S2308). If power returns after this (YES in S2309), S2401 in FIG. 24 is performed.

In other words, the second MP 1141B-1 (and 1141B-2) decides to stage the management information group 200-1 (and 200-2) from the SSD 1151-1 (and 1151-2) to the CM 1147-1 (and 1147-2) (S2401).

The second MP 1141B-1 to 1141B-4 also decide to return the duty data elements from the SSD 1151-1 to 1151-4 to the CM 1147-1 to 1147-4 (S2402).

Also the second MP 1141B-3 (and 1141B-4) decides to transfer the staged dirty data elements from the CM 1147-3 (and 1147-4) to the CM 1147-1 (and 1147-2) (S2403).

If the data elements constituting the management information group 200-1 (and 200-2) are staged from the SSD 1151-1 (and 1151-2) to the CM 1147-1 (and 1147-2) until staging of the management information group 200-1 (and 200-2) to the CM 1147-1 (and 1147-2) completes (NO in S2404 and S2404'), and this staging is completed (YES in S2404), the second MP 1141B-1 (and 1141B-2) decides, on the basis of the management information group 200-1 (and 200-2), to perform integration and restoration processing for the dirty data elements transferred from the slave DKC module 3 (and 4) (S2405).

Until the staging of all the saved dirty data elements to the CM 1147-1 to 1147-4 completes, the second MP 1141B-1 to 1141B-4 repeat reading of the dirty data elements from the SSD 1151-1 to 1151-4, and writing these dirty data elements to the CM 1147-1 to 1147-4 (NO in S2406 and S2407). When the staging of all the dirty data elements completes (YES in S2406), S2408 is performed. In S2407, the dirty data elements, read from the SSD 1151-1 to 1151-4, are staged in the saving source cache areas specified by the dirty data elements respectively (dotted line R1' to R4' in FIG. 10B).

Until all the staged dirty data elements are transferred from the CM 1147-3 (and 1147-4) to the DKC module 1 (and 2) (dotted lines T1' and T2' in FIG. 10B), the second MP 1141B-3 (and 1141B-4) repeats transfer of the dirty data elements from the CM 1147-3 (and 1147A-4) (NO in S2408 and S2409). When the transfer of all the dirty data elements completes (YES in S2408), S2410 is performed.

Until the integration and restoration processing of all the dirty data elements, which were transferred and written to the CM 1147-1 (and 1147-2), completes, the second MP 1141B-1 (and 1141B-2) repeats the integration and restoration processing of the dirty data elements (NO in S2410, and S2411).

When the integration and restoration processing of the dirty data elements completes (YES in S2410), the second MP 1141B-1 (and 1141B-2) releases the management information group 200-1 (and 200-2) (S2412).

Then the storage system 100 becomes ready status (status where receiving of I/O commands can be started) (S2413).

According to the above embodiment, the following four effects can be expected.
(Effect 1) Decrease of power capacity and size of battery
(Effect 2) Decrease of system down time
(Effect 3) Decrease of cost of storage system and effective use of hardware resources
(Effect 4) Improvement of failure resistance
Each effect will be described below.

<<(Effect 1) Decrease of Power Capacity and Size of Battery>>

If the total amount of dirty data elements in the CM 1147 is not even among each DKC module 113 (e.g. a first predetermined ratio or more of dirty data elements are stored in one or two DKC module(s) 113), the dirty data element group is divided into dirty sub-groups, which are copied to CM 1147 of other DKC modules 113 according to the above mentioned embodiments. Therefore the time required for backup, which is performed when power is supplied from the battery 118 (time for saving the dirty data elements in the CM 1147 to the SSD 1151), can be decreased. Therefore the power capacity required for backup can be decreased, and the size of the battery 118 can be decreased. For example, if 20 MB of a dirty data element group is stored in the CM 1147-1 in the DKC module 1, and the dirty data element is not stored in the other CMs 1147-2 to 1147-4, the dirty data element group in the CM 1147-1 is divided into four dirty sub-groups, 5 MB each, and three of them are copied to CM 1147-2 to 1147-4. The 5 MB of dirty sub-groups stored in the CM 1147-1 to 1147-4 are saved to the SSD 1151-1 to 1151-4. Therefore the data amount to be saved from the CM 1147-1 to the SSD 1151-1 decreases from 20 MB to 5 MB, in other words, about ¼ (the size of the management information group 200 is not considered here). Compared with the case of FIG. 5A, where the dirty data element group is not divided and copied, the time required for backup, performed with power supplied from the battery 118, became about ¼ if the dirty data element group is divided and copied, as shown in FIG. 5B. This means that the power capacity required for the battery 118 becomes about ¼, and the battery size can be decreased accordingly.

<<(Effect 2) Decrease of System Down Time>>

As mentioned above, the data volume to be backed up becomes about ¼, so the data volume required for restore also becomes about ¼, which means that recovery time length can be decreased, and therefore system down time can be decreased. In the above mentioned (case A), for example, a case where power returned after saving (backup) to the SSD 1151 completed is considered. If power returned after saving to SSD 1151 completed, each DKC module 1 to 4 stages the dirty data elements from the respective SSD 1151-1 to 1151-4 to the respective CM 1147-1 to 1147-4. Also the dirty data elements are transferred from the slave DKC modules 2 to 4 to the master (copy source) DKC module 1. In the SSD 1151-1 in the DKC module 1, the management information group 200, which was generated when the dirty data elements were copied to the other DKC modules, have been stored, and the DKC module 1 stages this management information group 200 to the CM 1147-1 with priority. When the staging of the management information group 200 completes in the DKC module 1, the DKC module 1 starts integrating the dirty data elements transferred from the slave DKC modules 2 to 4, and the DKC module 1 performs restoration processing of the dirty data elements based on the management information group. When the restoration processing of the dirty data elements completes in the DKC module 1, the storage system 100 can enter the status where I/O commands can be accepted from the host computer 1100 (ready status). According to this, the staging time from the SSD 1151-1 to the CM 1147-1 in the DKC module 1 is about ¼, as shown in FIG. 5B, compared with the case of saving the dirty data element group to one SSD 1151-1 (case of FIG. 5A). Therefore the time from the return of power to system ready status (time when the storage system 100 becomes ready status) can be decreased to about ¼. The transfer of the dirty data elements from the slave DKC module to the master DKC module is performed in parallel with the staging of the dirty data elements from the SSD 1151 to the CM 1147 in the slave DKC module or master DKC module, and the transfer speed of data between DKC modules, which is extremely fast compared with the data transfer speed from the SSD 1151-1 to the CM 1147-1, can be ignored.

<<(Effect 3) Decrease of Cost of Storage System and Effective Use of Hardware Resources>>

A controller of a general storage system is divided into a plurality of DKC modules, as shown in the examples in FIG. 1A and FIG. 2. This is beneficial to a user of the storage system 100 as it decreases the installation cost of the storage system 100 and allows use of hardware resource effectively. For example, when a user is to install a storage system, the scale of the storage system may become much bigger than the scale the user expected when planning installation. In this case, the user must pay extra cost for the unnecessary hardware resources at installation. According to the present embodiment, DKC modules can be added according to the necessity of the user (e.g. expansion of operation scale), so the user can decrease the installation cost and utilize the hardware resources effectively.

<<(Effect 4) Improvement of Failure Resistance>>

Since the storage system controller is divided into a plurality of DKC modules, an improvement in failure resistance can be expected. Generally a storage system has a structure where a controller and power supply thereof are redundant, but in the present embodiment, the controller is further divided into a plurality of DKC modules, so the influence range when a failure occurs is limited. In other words, influence can be decreased. For example, using a DKC module, the data can be written to or read from a target LDEV, or an LDEV of another DKC module. Therefore even if all the LDEVs of a certain DKC module are closed, the write data can be temporarily stored to an LDEV of another DKC module. Or even if all the MP-PKs 1137 of a certain DKC module are closed, MP 1141A or 1141B in the MP-PK 1137 in another DKC module can take over and execute the job.

Embodiments of the present invention were described above, but these are examples for describing the present invention and not for limiting the scope of the present invention only to these embodiments. The present invention can be embodied in various other modes.

For example, the second MP 1141B performs such processing as copying dirty data elements among the DKC modules 113, backing up of dirty data elements from the CM 1147 to the SSD 1151, and staging of the dirty data elements from the SSD 1151 to the CM 1147, but at least one of the processings may be performed by the first MP 1141A alone, or in cooperation with the second MP 1141B.

If the number of slave DKC modules for one master DKC module is k (k is a 2 or higher integer), the relationship of the above mentioned first predetermined ratio and the second predetermined ratio can be a range where the sum of (the first predetermined ratio×1/k) and the second predetermined ratio does not exceed the first predetermined ratio. For example, if the dirty data volume in the CM in the master DKC module is the capacity of the CM ($D_{max}$)×first predetermined ratio, then the dirty data volume of the DKC module in the slave is $D_0$ (current dirty data volume)+$D_{max}$×first predetermined ratio× 1/k, and this result must not exceed $D_{max}$×first predetermined ratio, so the expression ($D_0$+$D_{max}$×first predetermined ratio× 1/k)<$D_{max}$×first predetermined ratio is established, and the second predetermined ratio can be less than $D_0/D_{max}$.

What is claimed is:

1. A method for backing up data stored in a cache memory, which is performed in a storage system for temporarily storing data from a host device to a cache memory and then writing the data to a storage device, the method comprising steps of:

if a consumption ratio, which is a ratio of a total amount of dirty data elements which are stored in a first cache memory in a first control module of a plurality of control modules to a storage capacity of the first cache memory, is greater than or equal to a first predetermined ratio, then dividing the dirty data elements into first dirty data elements and second dirty data elements and copying the second dirty data elements to a second cache memory in a second control module of the plurality of control modules, wherein the dirty data elements are evenly divided according to the total of the number of the first control modules and the number of the second control modules provided where one or more second control modules are provided for each of the first control modules;

while power is supplied from a primary power supply, copying the second dirty data elements to the second cache memory; and if power is supplied from a battery after power supplied from the primary power supply stops:

backing up the first dirty data elements, which are stored in the first cache memory and are not copied to the second control module, from the first cache memory to a first non-volatile memory in the first control module;

backing up the second dirty data elements by the second control unit from the second cache memory to a second non-volatile memory in the second control module;

creating management information by the first control module to indicate a cache area, where a dirty data element exists, of the first cache memory and to indicate a control module to which the dirty data element is copied in the control module;

writing the management information to the first cache memory;

updating the management information as copying of the dirty data element completes; and backing up the management information, in addition to the dirty data element, from the first cache memory to the first non-volatile memory.

2. The method according to claim 1, wherein if power is supplied again from the primary power supply after the battery runs down, the first dirty data elements are staged from the first non-volatile memory to the first cache memory, the second dirty data elements are staged from the second non-volatile memory to the second cache memory, and the second dirty data elements are copied from the second cache memory to the first cache memory in parallel with the staging.

3. The method according to claim 2, wherein when the primary power supply is restarted, the management information, in addition to the dirty data element, is staged from the first non-volatile memory to the first cache memory.

4. A storage system, comprising:

a plurality of control modules for receiving I/O commands sent from a host device;

a plurality of storage devices for storing data according to I/O commands from the host device; and a plurality of power supply modules, which are power supplies of the plurality of control modules respectively, wherein each power supply module includes a primary power supply and a battery; wherein:

each control module includes a cache memory, a non-volatile memory, and a control unit, and the control unit writes data according to an I/O command from the host device to the cache memory, and writes the data written in the cache memory to at least one of the plurality of storage devices or sends the data to the host device, a first control unit in a first control module included in the plurality of control modules divides dirty data elements, which are stored in a first cache memory included in the first control module and have not yet been written in the storage device, into first dirty data elements and second dirty data elements, and copies the second dirty data elements to a second control unit in a second control module included in the plurality of control modules, and does not copy the first dirty data elements to the second control, unit if a consumption ratio, which is a ratio of a total amount of the dirty data elements which are stored in the first cache memory to a storage capacity of the first cache memory, is greater than or equal to a first predetermined ratio;

the second control unit writes the second dirty data elements to a second cache memory in the second control module, if power is supplied from the battery after power supplied from the primary power supply stops, the first control unit backs up the first dirty data elements, which are stored in the first cache memory and are not copied to the second control module, from the first cache memory to a first non-volatile memory in the first control module, and the second control unit backs up the second dirty data elements from the second cache memory to a second non-volatile memory in the second control module, the number of the second control modules is greater than or equal to the number of the first control modules and one or more second control modules are provided for one first control module, each of the first control modules and the second control modules further includes a connection unit for communicably connecting the cache memory, the non-volatile memory, and the control unit, the first control modules and the second control modules are interconnected by the interconnection of the control units, the primary power supply supplies power to the cache memory and the control unit, and the battery supplies power to the cache memory and the control unit when power from the primary power supply stops, the first control unit receives I/O commands from the host device while power is being supplied from the primary power supply, and if the received I/O command is a write command, then the first control unit:

writes a data element according to the write command to the first cache memory, creates management information to indicate a cache area where a dirty data element exists, of the first cache memory and to indicate a first control module to which the dirty data element is copied, writes the information to the first cache memory, sends an instruction to copy the first dirty data elements to the second control unit via two or more connection units including a first connection unit of the first control module and a second connection unit of the second control module, then if a plurality of new dirty data elements exist in the first cache memory because of a plurality of data elements according to one or more write commands have been written to the first cache memory, the first control unit divides the dirty data elements of the new plurality of dirty data elements into first dirty data elements and second dirty data elements, and copies the second dirty data elements to the second control unit via the two or more connection units, and updates the management information as copying of the second dirty data elements completes, while power is supplied from the battery after the power supplied from the primary power supply stops, the second control unit:

backs up the second dirty data elements written in the second cache memory to the second non-volatile memory of the second control module, stages the second dirty data elements from the second non-volatile memory to the second cache memory when the primary power supply is restarted, and sends an instruction to copy the staged second dirty data elements to the first control unit via the two or more connection units in parallel with the staging, and while power is supplied from the battery after power supplied from the primary power supply stops, the first control unit:

backs up the first dirty data elements, and the management information from the first cache memory to the first non-volatile memory of the first control module, stages the management information and the first dirty data elements from the first non-volatile memory to the first cache memory when the primary power supply is restarted, and writes the second dirty data elements staged in the second cache memory to the first cache memory.

5. The storage system according to claim 4, wherein
the first control unit, when a write command is received from the host device and if the consumption ratio of the first cache memory is greater than or equal to a second predetermined ratio, sends one or more data elements according to the write command to another control module via two or more connection units including a connection unit in the other control module and the first connection unit, and another control unit in the other control module writes the one or more data elements to a cache memory in the other control module.

6. The storage system according to claim 4, wherein
two or more storage devices of the plurality of storage devices are assigned to each control module respectively, each logical volume is formed based on the two or more storage devices, and each logical volume is a logical volume of which each control module is in-charge, and when the first control unit receives a write command from the host device and if an open status of an assigned logical volume for the first control unit, specified by the write command, is different than a predetermined status, then the first control unit sends one or more data elements according to the write command to the other control module via two or more connection units including a connection unit of the other control module and the first connection unit, another control unit in the other control module writes the one or more data elements to a cache memory in the other control module, and writes the one or more data elements written in the cache memory to a logical volume assigned to the other control module.

7. The storage system according to claim 4, wherein
a control module having a cache memory of which the consumption ratio, which is a ratio of the total amount of dirty data elements to the storage capacity of the cache memory, is greater than or equal to the first predetermined ratio, becomes the first control module, and a control module having a cache memory of which the consumption ratio is less than a third predetermined ratio, becomes the second control module.

8. The storage system according to claim 4, wherein if the received I/O command is a write command, the first control unit is further configured to:
update the management information as copying of the dirty data elements completes, and back up the first dirty data elements and the management information from the first cache memory to the first non-volatile memory.

9. The storage system according to claim 4, wherein the first control unit evenly divides the dirty data elements according to the total of the number of the first control modules and the number of the second control modules, where one or more second control modules are provided for each of the first control modules.

* * * * *